(12) United States Patent
Bassi et al.

(10) Patent No.: US 8,768,094 B2
(45) Date of Patent: Jul. 1, 2014

(54) SYSTEM AND METHOD FOR AUTOMATED CALIBRATION AND CORRECTION OF DISPLAY GEOMETRY AND COLOR

(71) Applicant: GEO Semiconductor Inc., Santa Clara, CA (US)

(72) Inventors: Zorawar S. Bassi, Markham (CA); Masoud Vakili, Mountain View, CA (US)

(73) Assignee: GEO Semiconductor Inc., San Jose, CA (US)

( * ) Notice: Subject to any disclaimer, the term of this patent is extended or adjusted under 35 U.S.C. 154(b) by 0 days.

(21) Appl. No.: 13/755,592

(22) Filed: Jan. 31, 2013

(65) Prior Publication Data

US 2013/0141593 A1  Jun. 6, 2013

Related U.S. Application Data

(62) Division of application No. 11/835,686, filed on Aug. 8, 2007.

(60) Provisional application No. 60/836,940, filed on Aug. 11, 2006, provisional application No. 60/917,525, filed on May 11, 2007.

(51) Int. Cl.
*G06K 9/40* (2006.01)
*H04N 5/225* (2006.01)
*H04N 5/64* (2006.01)
*H04N 9/31* (2006.01)

(52) U.S. Cl.
USPC .............. 382/275; 348/222.1; 348/744

(58) Field of Classification Search
USPC ......... 382/276, 293, 294, 295, 296, 298, 299, 382/284, 300; 348/231.3, 231.6, 333.11, 348/333.12, 222.1, 241, 250
See application file for complete search history.

(56) References Cited

U.S. PATENT DOCUMENTS

| | | | |
|---|---|---|---|
| 6,310,662 B1 | 10/2001 | Sunakawa et al. | |
| 6,538,691 B1 | 3/2003 | Macy et al. | |
| 6,618,076 B1 * | 9/2003 | Sukthankar et al. | 348/180 |
| 6,999,046 B2 | 2/2006 | Karstens | |
| 7,227,592 B2 | 6/2007 | Waters et al. | |
| 7,262,816 B2 | 8/2007 | McDowall et al. | |
| 7,675,556 B2 | 3/2010 | Smith et al. | |
| 2006/0050074 A1 | 3/2006 | Bassi | |
| 2006/0098168 A1 | 5/2006 | McDowall et al. | |
| 2006/0159365 A1 | 7/2006 | Chang | |
| 2007/0291186 A1 * | 12/2007 | McDowall et al. | 348/746 |

* cited by examiner

*Primary Examiner* — Andrae S Allison
(74) *Attorney, Agent, or Firm* — Sughrue Mion, PLLC

(57) ABSTRACT

Various embodiments are described herein for a system and method for calibrating a display device to eliminate distortions due to various components such as one or more of lenses, mirrors, projection geometry, lateral chromatic aberration and color misalignment, and color and brightness non-uniformity. Calibration for distortions that vary over time is also addressed. Sensing devices coupled to processors can be used to sense display characteristics, which are then used to compute distortion data, and generate pre-compensating maps to correct for display distortions.

21 Claims, 20 Drawing Sheets

SYSTEM AND METHOD FOR AUTOMATED CALIBRATION AND CORRECTION OF DISPLAY GEOMETRY AND COLOR

PRIORITY CLAIM

This application is a divisional of U.S. application Ser. No. 11/835,686, filed Aug. 8, 2007, which claims priority from U.S. Provisional Patent Application Ser. No. 60/836,940 filed Aug. 11, 2006 and U.S. Provisional Patent Application Ser. No. 60/917,525 filed May 11, 2007, each of which is incorporated herein by reference in its entirety.

FIELD

Various embodiments are discussed relating to calibration of display devices.

BACKGROUND

Most image display devices exhibit some form of geometric or color distortion. These distortions can have various causes, such as, geometric setting, non-ideal properties of the various optical components in the system, misalignment of the various components, complicated display surfaces and optical paths leading to geometric distortion and imperfections in the panels, etc. Depending on the system, the amount of distortion can vary greatly, from non-detectable to very objectionable. The effect of the distortion can also vary and may result in a change in the image color or a change in the image shape or geometry.

SUMMARY

In one aspect, at least one embodiment described herein provides a display calibration system for use with a display device having a viewing surface. The display calibration system comprises at least one sensing device adapted to sense information about at least one of shape, size, boundary, and orientation of the viewing surface, and, at least one processor coupled to the at least one sensing device and being adapted to compute display device characterizations based on sensed information by the at least one sensing device.

In another aspect, at least one embodiment described herein provides a display calibration system for use with a display device having a viewing surface. The display calibration system comprises at least one sensing device adapted to sense information from test images displayed on the viewing surface; and, at least one processor coupled to the at least one sensing device, the at least one processor being adapted to compute display distortions based on the sensed information and generate pre-compensating maps to compensate for the display distortions. The pre-compensating maps can be implemented by surface functions. When the pre-compensating maps are applied to input image data prior to display, a resulting displayed image on the viewing surface is substantially distortion free.

In another aspect, at least one embodiment described herein provides a display calibration system for use with a display device having a viewing surface. The display calibration system comprises at least one image sensing device adapted to sense information from test images displayed on the viewing surface, and, at least one processor coupled to the at least one image sensing device, the at least one processor being adapted to compute display distortions based on the sensed information, partition the viewing surface into patches according to the severity of the display distortions in each patch, and generate pre-compensating maps for the display distortions in each patch, such that when the pre-compensating maps are applied to input image data prior to display, a resulting displayed image on the viewing surface is substantially distortion free.

In another aspect, at least one embodiment described herein provides a display calibration system for use with a display device having a viewing surface. The display calibration system comprises at least one image sensing device adapted to sense color information from test images displayed on the viewing surface for at least one color component independently, and, at least one processor coupled to the at least one image sensing device, the at least one processor being adapted to compute color non-uniformity based on the sensed color information and to generate at least one color correction map for the at least one color component, such that when the at least one color correction map is applied to input image data prior to display, a resulting displayed image on the viewing surface is substantially free of at least one color non-uniformity.

In another aspect, at least one embodiment described herein provides a display calibration system for use with a display device having a viewing surface. The display calibration system comprises at least one image sensing device adapted to sense information from individual color component test images displayed on the viewing surface, and, at least one processor coupled to the at least one image sensing device and the display device, the at least one processor being adapted to compute geometric display distortions for at least one color component independently based on the sensed information and to generate at least one pre-compensating map for the at least one color component independently, such that when the at least one color correction map is applied to input image data prior to display, a resulting displayed image on the viewing surface is substantially free of at least one color-dependent geometric distortion.

In another aspect, at least one embodiment described herein provides a display calibration method for use in a projection system with a curved viewing surface, wherein the method comprises:
 using multiple projectors to project different portions of an image onto a corresponding portion of the curved viewing surface; and
 focusing substantially each portion of the image on the corresponding portion of the curved viewing surface to form the image in its entirety on the curved viewing surface with optimized focus.

In another aspect, at least one embodiment described herein provides a display calibration method for use in a projection system with a curved viewing surface, wherein said method comprises:
 measuring a plurality of distances from the curved viewing surface to a focal plane of the projected image; and
 shifting the focal plane until a function of the plurality of distances is minimized to obtain optimized focus.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

DETAILED DESCRIPTION

Figure 1:
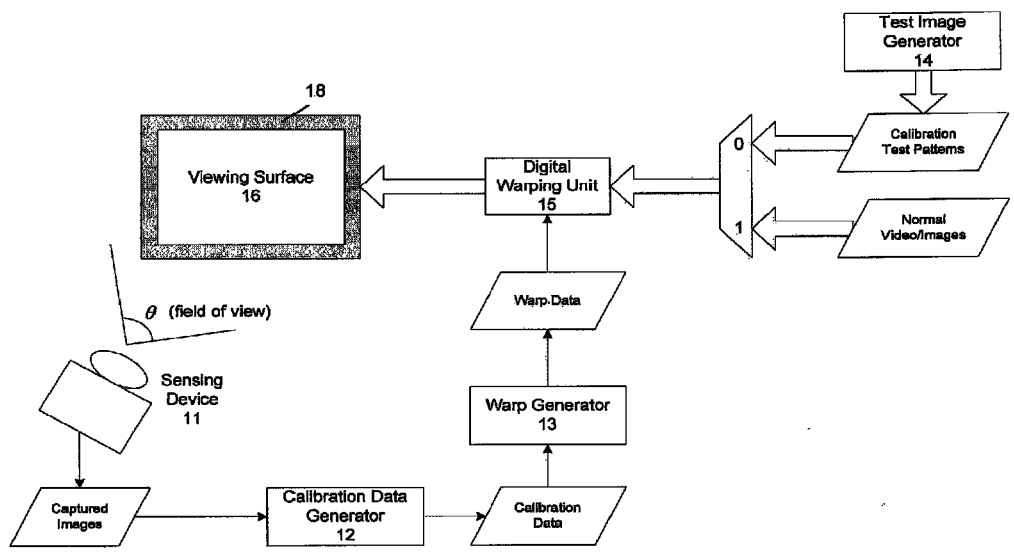
FIG. 1 is a diagram of an exemplary embodiment of an automated calibration and correction system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

Important distortions for display devices include: distortion due to the lens components, distortion from mirror (curved or planar) reflection assemblies, distortion due to projection geometry, such as off angle and rotated projection (keystone, rotations) and projection onto curved screens, lateral chromatic aberration and distortions that differ per color, such as misalignments, misconvergence in multiple microdisplay devices, color and luminance (brightness) non-uniformity, and distortions due to optical focus problems (spherical aberrations, astigmatism, etc.)

The first set is seen as geometric distortions in the final image, i.e. the input image shape is not preserved. Chromatic aberrations are also a geometric distortion; however the distortion varies for each color component. These distortions are very common in projection (front or rear) based display devices and will collectively be referred to as geometric distortions. Chrominance and luminance non-uniformity can affect all display devices, whereby a signal, meant to be of fixed luminance or chrominance, is seen to vary across a viewing surface of a display device or differ from its intended perception. This type of distortion can be caused by light sources with varying brightness, varying optical path lengths across the display, and non-uniform sensor responses in panels (e.g. LCD, LCOS, Plasma Displays). Focus related distortions will blur an image and are due to different points on the object plane being brought to focus on different image planes. In the exemplary embodiments given herein, certain issues related to focus and depth of focus are addressed.

The embodiments presented herein describe a system and method that will calibrate a display device to eliminate or reduce at least some of the aforementioned distortions. These embodiments automate both the generation of calibration data and the resulting correction and the application of the correction. Calibration for distortions that vary over time is also addressed. The calibration stage (which generates calibration data) involves characterization of the display, capturing specialized test patterns viewed on the display device by means of a sensing device such as a high resolution camera, for example, and extracting required data (i.e. calibration data) from these images. The correction stage involves pre-distorting the image via an electronic correction means to render a distortion-free image on the screen. A mechanism for achieving optimal focus of the display and captured test patterns is also presented.

FIG. 1 shows a diagram of an exemplary embodiment of an automated calibration and correction system for correcting images that are displayed on viewing surface 16 of a display device. The automated calibration and correction system includes test image generator 14, sensing device 11, calibration data generator 12, warp generator 13, and digital warping unit 15. The display device can be a TV (rear projection TV, LCD, Plasma, etc.), a front projection system (i.e. a projector with a screen) or any other system that presents an image, all of which have a viewing surface. The viewing surface 16 will usually have a boundary or frame that distinguishes it from the background; normally this would be a physical bezel surrounding the display screen (viewing surface). However, the boundary need not be the bezel or some physical feature.

In general, a boundary can be associated with any area on the physical viewing surface 16 that can be distinguished by some means from the background region. For example, a rectangular outline, that is projected on the display, by means external to the display, and lies inside the physical bezel, can be identified as the boundary. In the exemplary embodiments given herein, the viewing surface 16, from a calibration and correction perspective, is taken to be that region of the physical display device, which lies within the identified boundary, which may be the bezel itself in at least some cases. The boundary is also referred to as the viewing surface frame, which is shown as surrounding the viewing surface 16 in FIG. 1.

Figure 2A:
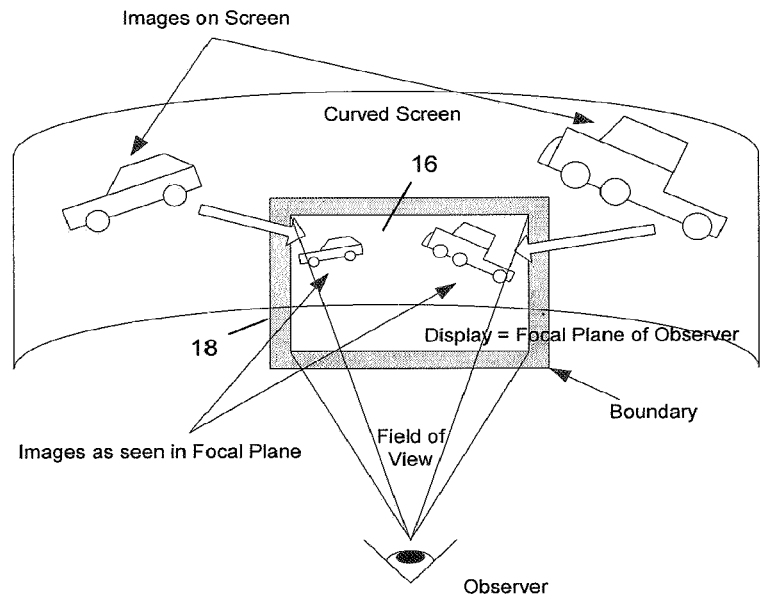
FIGS. 2a and 2b are illustrations of curved screen geometry.

For curved screens, which have varying depth, two main viewpoints for the display can be adopted. The viewing plane can be viewed as the focal plane in which the image is to be brought to a corrected form, which may differ from the physical viewing surface 16 or contain only part of the physical viewing surface 16. All points on the focal plane have the same focus depth. In this case physical markers or the field of view of the sensing device (i.e. the observer) will determine the focal plane boundary (see FIG. 2a). The viewing surface frame, when available is used to determine the orientation of the camera relative to the viewing surface 16.

Figure 2B:
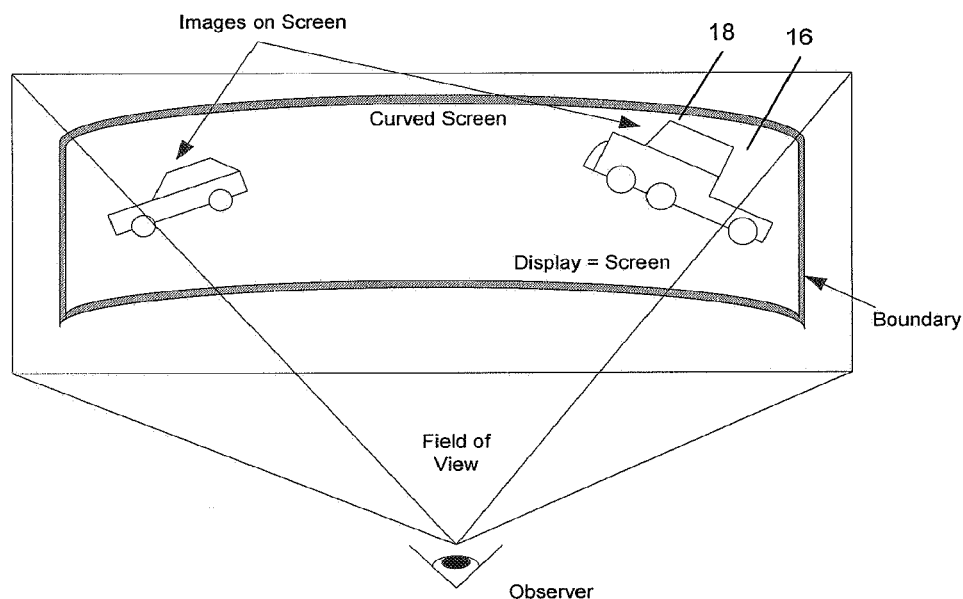

Alternatively, the entire screen may be viewed, with the physical bezel forming the boundary (see FIG. 2b), which is curved. Here different points on the screen have different focus depths. The calibration and correction aims to match the final image to the curved boundary.

These two viewpoints can be combined to identify different display regions for which the calibration and correction is required. For example, the boundary can be taken to be a combination of the physical bezel, along with the captured image outline, at a specific focal plane. A curved boundary may also be enforced on a flat display by projecting a curved outline. This can be viewed as a special case where the boundary is curved but the screen itself is flat, i.e. has an infinite radius of curvature.

Figure 3:
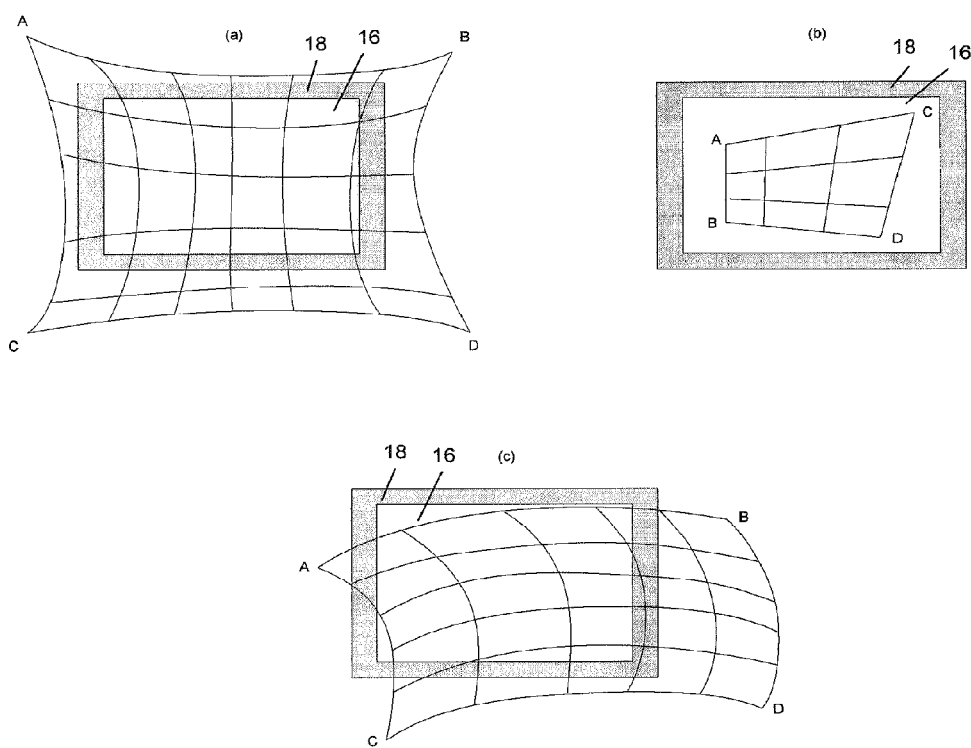
FIG. 3 is an illustration of examples of overflow, underflow, and mismatch in geometric distortions.

For distortions that involve a change in shape or geometry, images viewed on the viewing surface 16 (prior to correction) may not be fully contained (overflow). This is shown in FIG. 3. In case (a), the image ABCD overflows to fully contain the viewing surface frame 18 whereas in case (b) the image is fully contained (underflow). Case (c) is an intermediate situation (mismatch) where the image partially covers the viewing surface 16. All three situations may arise from either front or rear projection systems and can be corrected with the current system.

The test image generator 14 provides images that contain specialized patterns designed for the calibration process; these images are also referred to as calibration test patterns. The most commonly used calibration test patterns that may be used include: regular (non-connected) grid patterns, circles, squares, horizontal and vertical patterns, bars, lines, concentric patterns, rectangles, circles, and uniform grey and color levels. Colored (for the various primaries) versions of the above can be used for lateral chromatic aberration correction and chrominance non-uniformity correction. The shapes in the patterns are also referred to as features. Every pattern has its feature characteristics well-defined, that is, the number, positions, sizes, boundaries, colors and any other defining parameters, of the features are known.

Figure 4:
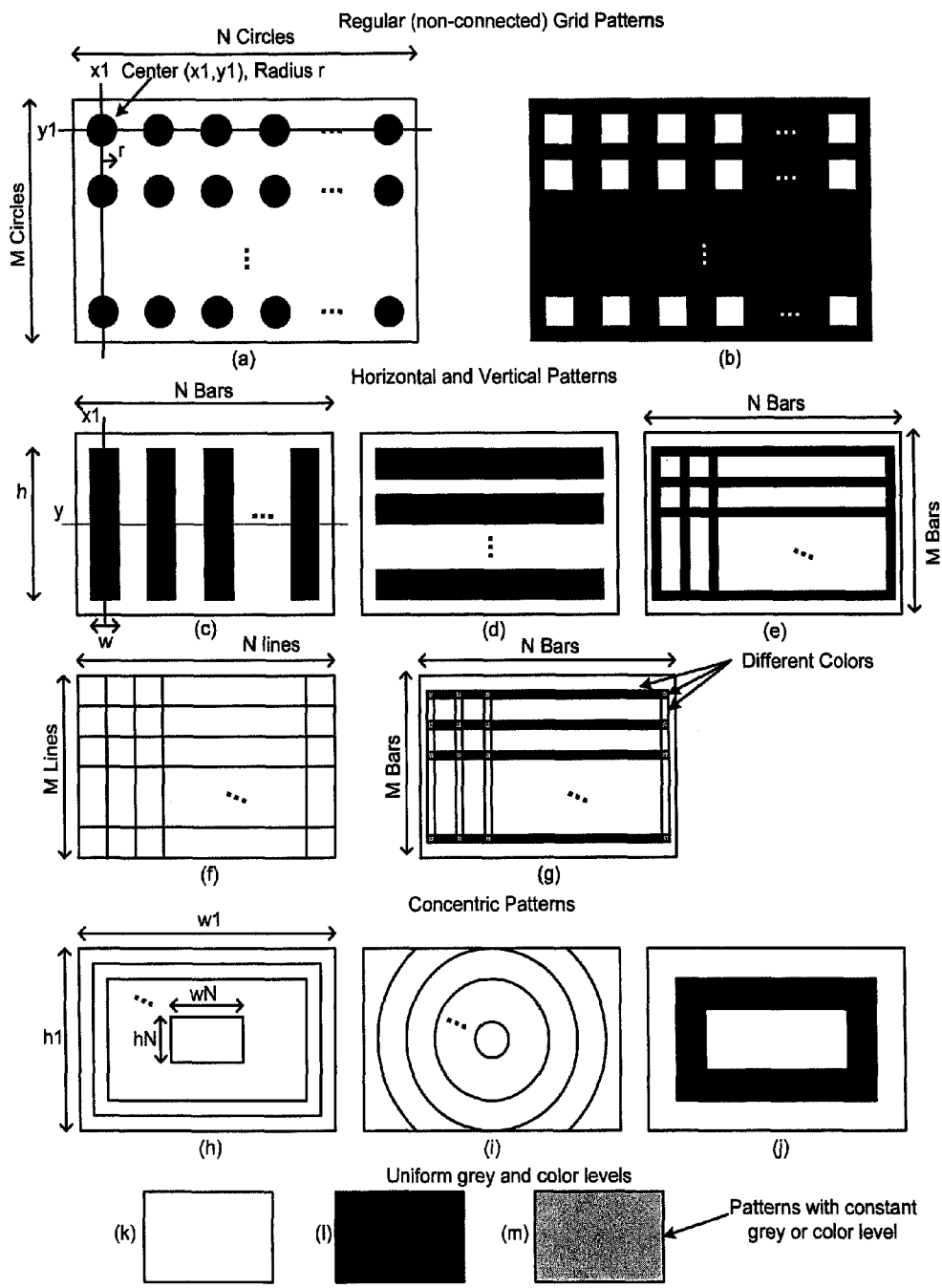
FIG. 4 is an illustration of examples of calibration image test patterns.

Several exemplary calibration patterns are shown in panels (a) to (m) of FIG. 4. The guiding lines showing the characteristics (center position, radius, etc.) are not part of the test patterns. Color and shape variations of these test patterns can also be used for interchanging black and white, replacing the black and white with color, using different colors for different features within a pattern, combining different shapes within a pattern, and varying grey and color levels.

Versions of these patterns using the primary colors are used for calibrating lateral chromatic aberration. An exemplary color pattern is shown in panel (g), where the horizontal bars, the vertical bars and their intersections are all different colors.

Every pattern presents some definite characteristics, of which the most notable are the center positions of the shapes and their boundaries which can mathematically be viewed as points and lines respectively.

The sensing device 11 records the calibration test patterns as seen on the viewing surface 16. For correcting geometric distortions, the sensing device 11 can be a camera. The resolution and capture format of the camera can be selected depending on the accuracy required in the correction. When correcting for chrominance and luminance non-uniformity, the sensing device 11 can be a color analyzer (e.g. photometer or spectrometer).

In this exemplary embodiment, for correcting geometry errors, the sensing device 11 can be placed at any position relative to the display device. This freedom in positioning the sensing device 11 is possible because of the fact that the captured images are allowed to include a distortion component due to the positioning of the sensing device 11. Unless the sensing device 11 views the viewing surface 16 directly (i.e. head on), there will be a keystone component due to the sensing device 11. This distortion could occur in up to three different axes which are taken into account as multiple-axis keystone distortion components.

In addition, since the optics of the sensing device 11, such as a camera, has its own distortions, there is also an optical distortion component which is taken into account. Other types of sensing devices 11 have other intrinsic distortions. The combined distortions introduced by the camera or the sensing device 11 will be referred to as the camera distortion. The camera distortion is determined and compensated for when generating the calibration data.

To determine the camera distortion, in at least one exemplary embodiment, physical reference markers, whose distortion-free orientations/shapes are known, are used. These markers are captured by the camera, and by comparing their orientations/shapes in the captured image with their distortion-free orientations/shapes, the camera distortion can be determined. One natural marker is the frame (boundary) itself which is known to be of a given orientation and shape (commonly a rectangle that is non-distorted in the real-world). The frame is also the reference to which the calibration is done, namely, the corrected image should be straight relative to the frame. Therefore, when correcting geometric distortions, the images captured by the camera should include the viewing screen boundaries (i.e. the frame 18).

In another exemplary embodiment, wherein the boundaries are not detectable, sensors in the camera are used to sense signals from emitters on the screen to determine the camera distortion relative to the viewing surface 16. The resulting measurements generate a map of the viewing surface 16 as seen from the camera.

When correcting for lateral chromatic aberration, the camera will capture K sets of images, where K is the number of color components e.g. the three primaries RGB. At least some of the test patterns in FIG. 4 will be repeated for each color component.

Brightness and color (luminance and chrominance) corrections are made regardless of the relevance of geometric corrections. In projection systems these brightness and color corrections are done after correcting for geometric distortions. In flat-panel display devices, where no geometric distortion is present, luminance and color corrections are done directly. In one exemplary embodiment, a sensing device, such as a color analyzer, is placed directly at or near the viewing surface 16 to extract color information. In this case correcting for the sensing device positioning is not necessary. The sensing device 11 may capture the entire image or information at specific points. In the latter case, data from a grid of points on the screen need to be captured. If the sensing device 11 is in a keystone position relative to the viewing surface 16 then correction due to its positioning needs to be made similar to that of the camera above.

For display devices having geometric distortions, luminance and color corrections should be done after the geometric correction has been made. This means that the display device is first corrected for geometric distortions including color-dependent ones. Correcting for the color after geometry correction allows any additional color distortion introduced by the geometry correction to be accounted for and ensures that only regions containing the final image (i.e. not background) is corrected.

In this exemplary embodiment, calibration data generator 12 analyzes the images and extracts calibration data in a format that is used by warp generator 13, which in turn provides warp data for digital warping unit 15.

Digital warping can be generally described as applying a pre-compensating map to perform a mathematical transformation between the input image coordinates and the output image coordinates according to equation (1).

$$(u_i, v_i, \vec{C}_i) \Leftrightarrow (x_i, y_i, \vec{C}'_i) \tag{1}$$

In equation (1), i ranges over the input pixel coordinates, $(u_i, v_i)$ gives the input pixel's spatial coordinates, $\vec{C}_i$ gives the input pixel's color, $(x_i, y_i)$ gives the output pixel's spatial coordinates as mapped to the output space, and $\vec{C}'_i$ gives the corresponding pixel's output color. For a three primary color system, $\vec{C}$ is simply an RGB value. Equation (1) is a representation of the correction, in the form of a grid. Using a grid format directly by a processor is difficult, where the correction has to be applied in real-time, such as a 60 Hz frame rate for video. Hence, the warp generator converts equation (1) into a more hardware efficient format. The calibration data generator 12 consists of three sub-generators for calibrating for geometry, lateral color and color non-uniformity respectively.

In the following, the calibration data for correcting geometry will be discussed first. In the examples given below, the primary test patterns analyzed are those that have a grid pattern, such as the patterns shown in panels (a) and (b) in FIG. 4. The patterns in panels (e) to (g) in FIG. 4 can also be used as the intersections of the bars/lines provides a grid.

Test images such as grid-type patterns provide a set of shapes centered about a known position in the input space. These centers can be denoted as $(x_i^o, y_i^o)$ where i ranges over the shapes. There are M×N shapes in total, starting from the top left and proceeding along rows of the test pattern and $W_T \times H_T$ the resolution of the test pattern. The test pattern resolution need not match the native resolution of the display device. When displayed, the centers of the shapes in the test pattern will be transformed by the geometric distortion to some other values denoted by $(x_{di}^o, y_{di}^o)$. The shapes will also be distorted, i.e. a circle will be distorted to an ellipse, etc. These coordinates are defined in the display space with respect to an origin at the top left of the frame 18 of the viewing surface 16. Let $W_D \times H_D$ denote the resolution of the display device (inside of the frame 18) in an arbitrary measurement unit and the coordinates $(x_{di}^o, y_{di}^o)$ also in these same measurement units. The display space is equivalent to the real-world or observer space, namely the corrected image has to appear non-distorted in the display space.

The camera captures the image of the distorted grid pattern and sends it to the calibration data generator 12. The resolution of the camera is denoted by $W_C \times H_C$. In the embodiments given herein, the camera resolution does not have to match that of the display and, in addition, the camera can be positioned anywhere. The coordinates of the center of the camera space is $(x_{ci}^o, y_{ci}^o)$, with the origin being defined as the top left of the captured image.

The captured images are from the viewpoint of the camera, whereas the calibration has to be made in the real-world viewpoint, i.e. from the view of the observer. Therefore, the calibration procedure has to subtract the viewpoint of the camera, also referred to as the camera distortion. As discussed above, in one exemplary embodiment, this is done by using the viewing surface frame 18 as a marker. Accordingly, the camera image should also capture the viewing surface frame 18. In the real-world, the viewing surface frame 18 is defined by the coordinates:

Top Left:$(0,0)$

Top Right:$(W_D, 0)$

Bottom Left:$(0, H_D)$

Bottom Right:$(W_D, H_D)$ \hfill (2)

In the camera image, these coordinates become:

Top Left:$(x_{cTL}^d, y_{cTL}^d)$

Top Right:$(x_{cTR}^d, y_{cTR}^d)$

Bottom Left:$(x_{cBL}^d, y_{cBL}^d)$

Bottom Right:$(x_{cBR}^d, y_{cBR}^d)$ \hfill (3)

Figure 5:
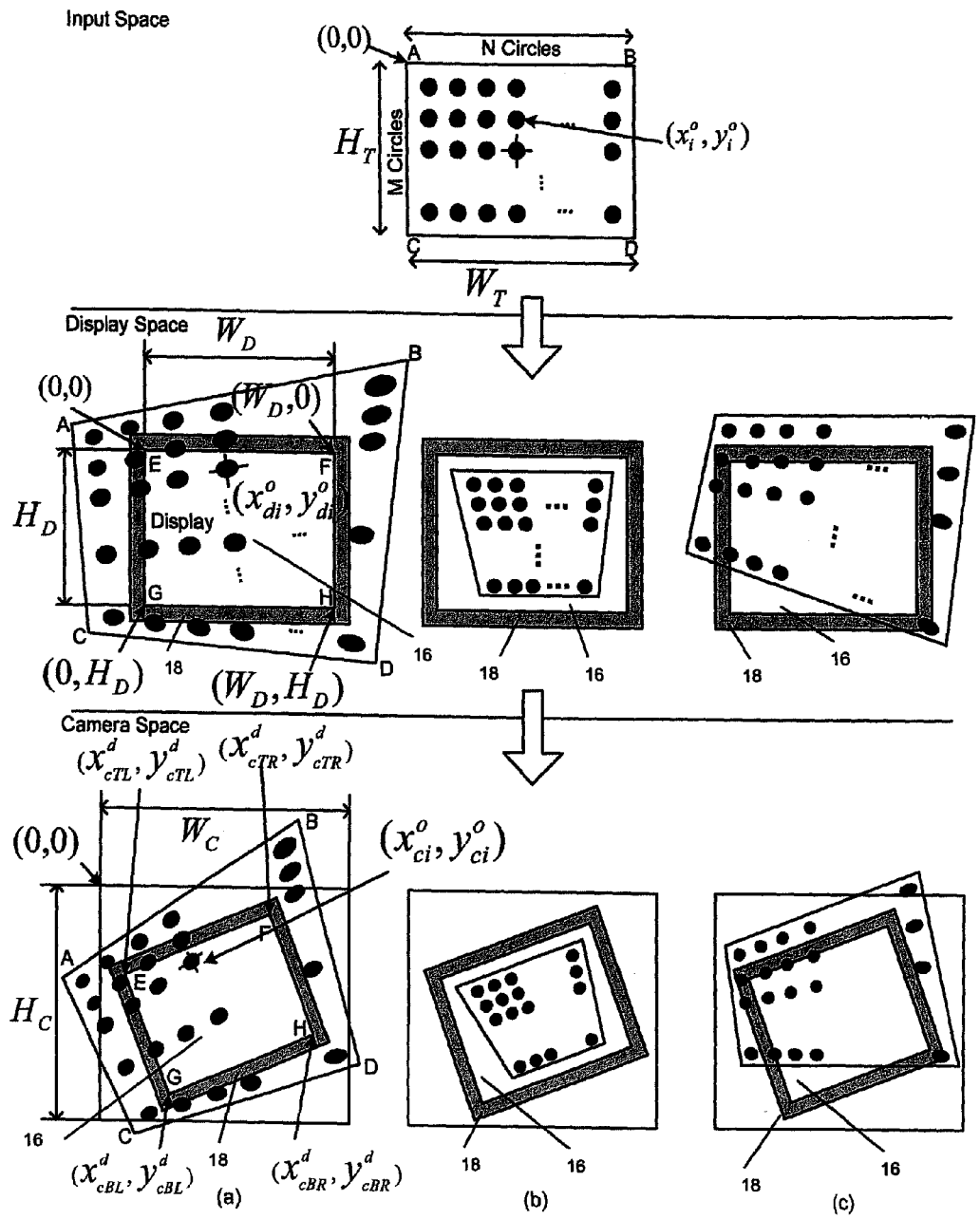
FIG. 5 is an illustration of calibration geometry and the various coordinate spaces involved.

FIG. 5 illustrates the various spaces and coordinate systems. Although the images are shown as black circles on a white background, all test patterns can be colored and use other shapes or features (see FIG. 4 for example). Three cases are shown in the display and camera spaces corresponding to: case (a) when the image overflows to completely cover the viewing surface frame 18, case (b) when the image completely fits inside or underflows the viewing surface frame 18 and case (c), an intermediate situation, or mismatch, where the image neither does not lie fully within the viewing surface frame 18. These cases are referred to as projection geometry classes. It should be noted that while the input and camera spaces are defined in terms of pixels, the display space can be in pixels, millimeters or some other unit.

The display distortion, denoted $f_D$, can be functionally described as the mapping given by equation (4).

$$f_D : (x_i^o, y_i^o) \rightarrow (x_{di}^o, y_{di}^o) \tag{4}$$

This implies that the correction ($f_D^C$) is the inverse of that given in equation 4 which is specified in equation 5.

$$f_D^C : (x_{di}^o, y_{di}^o) \rightarrow (x_i^o, y_i^o) \tag{5}$$

The digital warping unit 15 will apply the correction $f_D^C$ to the input image in order to warp (pre-distort) it prior to display.

Both the above maps are defined in the forward direction: the functional domain is the input image and the range is the output image. As it is well known, it is more efficient and accurate for an electronic correction circuit to generate an image using an inverse architecture. In an inverse warping architecture, the output image of the circuit is generated by mapping the pixels in the output to the input via the correction map and then filtering (i.e. assigning color values) in the input space. This also means that the correction map is represented in the inverse form, which will be labeled $f_W$. Since the correction in inverse form is the display distortion map itself ($f_W \equiv (f_C^D)^{-1} = f_D$), the map, or warping data, needed by an inverse architecture correction unit is simply the display distortion map. Therefore, the grid data to be generated by the calibration data generator 12 is defined in equation (6).

$$f_W:(x_i^o, y_i^o) \rightarrow (x_{di}^o, y_{di}^o) \quad (6)$$

It should be noted that the terms grid and mapping are often used interchangeably. This information needs to be extracted from the images captured by the camera, which lie in the camera space. The captured images correspond to the mapping defined in equation (7).

$$f_F:(x_i^o, y_i^o) \rightarrow (x_{ci}^o, y_{ci}^o) \quad (7)$$

This map, which will be referred to as the full image map, can be viewed as a combination of the display distortion map, $f_D$, and camera distortion map, $f_C$, the subtracting of which gives the required $f_W$ defined in equation (8).

$$f_C:(x_{di}^o, y_{di}^o) \rightarrow (x_{ci}^o, y_{ci}^o)$$

$$f_F = f_C f_D = f_C f_W \Rightarrow f_W = f_C^{-1} f_F \quad (8)$$

The subtraction of $f_C$ from $f_D$ is simply a concatenation (or functional composition) of the two maps. In addition, the coordinates ($x_{di}^o, y_{di}^o$) need to be brought to the correct pixel scale and origin as the display coordinate system scale and origin may not be applicable. This will be discussed in further detail below.

Figure 6:
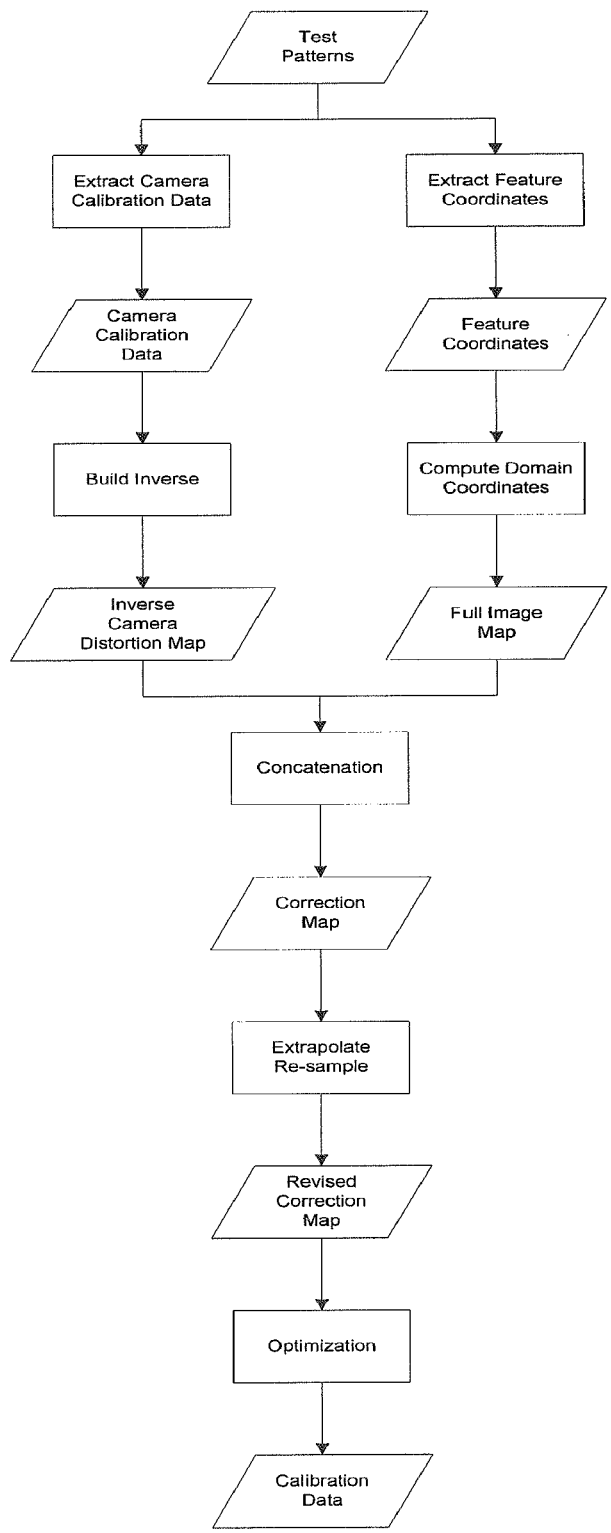
FIG. 6 is an illustration of an exemplary embodiment of a calibration data generator.

An exemplary embodiment of the calibration data generator 12 is shown in FIG. 6. The $W_C \times H_C$ camera image of a test pattern is first analyzed to extract the shape centers ($x_{ci}^o, y_{ci}^o$); this will give $f_F$. The shape centers in the camera space are the corresponding positions of the shape centers in input space, after being mapped by the display and camera distortions. For image regions that overflow the viewing surface 16, the shapes will not be usable. These outlying shapes will usually not be visible in a rear projection TV, or for a front projection system, as they will lie in the background on possibly a different plane. Therefore only shapes within the viewing surface 16 defined as EFGH (see FIG. 5) are analyzed.

The shape centers can be found using various image processing algorithms. One method involves converting the captured image to a binary (black and white) image using a threshold mechanism. The shapes in the binary image can have their pixels identified and labeled. The centroids for each set of classified pixels will then approximate the shape centers. The threshold value can be automatically determined by analyzing a histogram of the image. The histogram may be of the luminance or a specific hue of the captured image.

The captured images are also analyzed to extract the viewing surface coordinates and boundary. Different images may be used for this step. The frame coordinates are needed to determine the camera distortion $f_C$. If the camera has no optical distortion, then the camera distortion will be a perspective distortion, labeled $f_C^P$, and only the coordinates defined in equation (3) of the four corners are necessary to determine $f_C$. If the camera also has optical distortion, then additional markers are necessary. The frame boundary EFGH may provide sufficient markers that can be parameterized by the line equations of its edges. The edge equations can also be used to determine the four corners and determine which shapes lie inside the viewing surface 16. A physical rectangular grid with known coordinates, say ($x_{di}^{CC}, y_{di}^{CC}$) in display space, can also be attached to, or projected onto, the viewing surface 16 to provide additional markers, which will be imaged as ($x_{ci}^{CC}, y_{ci}^{CC}$) in the camera space. This grid can be viewed as the camera calibration (CC) grid. Determining the frame coordinates and boundary is also referred to as display characterization.

From the sensing device viewpoint, the scenarios of optical distortion within the camera lens and a curved screen are indistinguishable. In both cases, the markers and the frame are imaged as being curved. Therefore, a curved screen can also be addressed within the framework of a camera distortion and an associated CC grid. Correcting for the camera distortion will also ensure that the final image matches the curved frame. For curved screen correction, the CC grid can be constructed by attaching markers to the frame 18 at regular distances (as measured on the screen); these can then be interpolated to the interior of the frame 18. Markers also can be attached to the interior of the frame 18. Note that the screen though curved, is a two dimensional surface, hence allowing calibration via the two dimensional CC grid.

The edges (of the frame 18 or attached CC grid) or markers can be detected using standard image processing methods, such as edge detection for example. Knowing the positions of the edges, a line equation can be fit to the edge, and the intersections of the lines provide the four corners and CC grid coordinates. The edges, and the CC grid coordinates can be defined as shown in equation (9) where $N_{CC}$ is the number of points in the camera calibration grid.

$$(l_{Tx}(t), l_{Ty}(t)) \rightarrow \text{Top edge}$$

$$(l_{Rx}(t), l_{Ry}(t)) \rightarrow \text{Right edge}$$

$$(l_{Bx}(t), l_{By}(t)) \rightarrow \text{Bottom edge}$$

$$(l_{Lx}(t), l_{Ly}(t)) \rightarrow \text{Left edge}$$

$$(x_{ci}^{CC}, y_{ci}^{CC}), i=1 \ldots N_{CC} \rightarrow \text{Camera Calibration grid} \quad (9)$$

For some display devices (such as the ones having curved screens), a CC grid from physical markers may not be readily available. In this case, the edge equations can be used to mathematically build the CC grid. There is freedom as to how to place the points along the edges, and how to interpolate to the interior of the frame 18. Regardless of the method chosen, the final image will match the frame 18 provided that the domain coordinates (see discussion on ordering) are appropriately selected. One method of placement is to place the points equidistant along the edges, which can then be linearly interpolated to the interior.

If the manufacturer provides specifications on the camera's optical distortion, labeled $f_C^O$, then these specifications can be combined with the perspective distortion, to be used in place of or to generate the camera calibration grid, which is specified in equation (10).

$$f_C = f_C^O f_C^K:(x_{di}^{CC}, y_{di}^{CC}) \rightarrow (x_{ci}^{CC}, y_{ci}^{CC}) \quad (10)$$

The optical component of the camera distortion can be determined prior to the display calibration as it is independent of the camera position and orientation. Data in equations (3) and (9) will collectively be referred to as the camera calibration data.

Once the coordinates have been extracted, they need to be placed in the correct order. Mathematically, ordering will assign to each range coordinate ($x_{ci}^o, y_{ci}^o$) its corresponding domain coordinate ($x_i^o, y_i^o$). It is necessary to determine the domain coordinates in order to build the full image map $f_F$. The extraction process above does not provide any information on the domain coordinates. The centers will not necessarily be determined in an order that matches the shape ordering in the input test pattern.

Test patterns such as those shown in panels (c) and (d) of FIG. 4 can be used to order the points. Images captured from these test patterns can have their pixels classified according to the bars they belong to. The shape centers can also be placed within this classification. The horizontal and vertical bar to which the center belongs to, for example (r,s), will determine the domain coordinate $(x_i^o, y_i^o)$, where I is defined in equation (11).

$$i=(r-1)N+s \quad (11)$$

When ordering, it is important to determine which bars and shapes are inside the viewing surface frame 18. If the background region (outside the viewing surface frame 18) does not provide an image with high contrast, then an appropriate threshold (in the extract features coordinates step) alone will ensure only shapes and bars inside the viewing surface frame 18 are measured. If the outside shapes are also being imaged strongly, then comparison with the frame edges can determine which shapes and bars are inside. The numbering of the bars must account for any missing bars (those outside the frame 18). Bars, of a given numbering sequence, can be flashed one at a time to determine whether they lie inside or outside the frame. Different color bars can also be used to implicitly number them.

The camera calibration data also needs to be ordered, where the domain coordinates are in the display space. However, here the process is simpler as all features (by definition) lie inside the frame 18. In most cases, coordinate comparisons will suffice to determine the ordering. For the CC grid, the ordering will assign the grid $(x_{di}^{CC}, y_{di}^{CC})$, which are the domain coordinates (in display space) for the CC grid, which are referred to as the domain CC grid. The values of this domain CC grid will depend on whether the grid corresponds to physical markers or whether it was mathematically built. For the former, the known coordinates of the markers gives the domain CC grid. For the latter there is some freedom in selecting the domain CC grid. If the final image is to match the frame 18 (i.e. geometry class (a)), then the CC grid points on the edges must map to the corresponding edges on the rectangle EFGH. This means that the edges need to map as follows:

Top edge ⇔ Straight line through $\{(0,0),(W_D,0)\}$
Right edge ⇔ Straight line through $\{(W_D,0),(W_D,H_D)\}$
Bottom edge ⇔ Straight line through $\{(0,H_D),(W_D,H_D)\}$
Left edge ⇔ Straight line through $\{(0,0),(0,H_D)\}$ Aside from these constraints, the domain CC grid points can be chosen in any reasonable fashion. With the extraction and ordering complete, the mapping $f_W$ can be found using equation (8).

The camera calibration data is used to first construct the inverse camera distortion map $f_C^{-1}$. For the most common scenario of a pure perspective camera distortion (i.e. $f_C = f_C^P$), only the four corner points are required.

$$(x_{cTL}^d, y_{cTL}^d) \rightarrow (0,0)$$

$$(x_{cTR}^d, y_{cTR}^d) \rightarrow (W_D, 0)$$

$$(x_{cBL}^d, y_{cBR}^d) \rightarrow (0, H_D)$$

$$(x_{cBR}^d, y_{cBR}^d) \rightarrow (W_D, H_D) \quad (12)$$

The (inverse) perspective transformation is given by equation 13.

$$x_d = f_{Cx}^{P^{-1}}(x_c, y_c) \equiv \frac{ax_c + by_c + c}{gx_c + hy_c + 1} \quad (13)$$

$$y_d = f_{Cy}^{P^{-1}}(x_c, y_c) \equiv \frac{dx_c + ey_c + f}{gx_c + hy_c + 1}$$

$$f_C^{-1} = (f_{Cx}^{-1}, f_{Cy}^{-1}) = (f_{Cx}^{P^{-1}}, f_{Cy}^{P^{-1}})$$

Here $(x_d, y_d)$ are coordinates in the display space and $(x_c, y_c)$ are coordinates in the camera space. Using equation (12), eight linear equations are obtained, that can be solved for the coefficients $\{a,b,c,d,e,f,g,h\}$ that define the perspective transformation.

When the camera distortion includes an optical distortion component $f_C^O$, or will be correcting for a curved frame, the edge equations or CC grid is used to determine the inverse camera distortion map $f_C^{-1}$. One method is to use the CC grid, since it provides information on the distortion at interior points and not simply on the edge. The CC grid is given in equation (10). This grid can be either fit (in least squares sense) or interpolated by a given set of basis functions. One choice is to use a spline basis to obtain a spline fit or interpolant to the grid as defined in equation (14).

$$f_C^{-1}: (x_{ci}^{CC}, y_{ci}^{CC}) \rightarrow (x_{di}^{CC}, y_{di}^{CC}), \text{Fit or Interpolant to grid}$$

$$x_d = f_{Cx}^{I^{-1}}(x_c, y_c)$$

$$y_d = f_{Cy}^{I^{-1}}(x_c, y_c)$$

$$f_C^{-1} = (f_{Cx}^{-1}, f_{Cy}^{-1}) = (f_{Cx}^{I^{-1}}, f_{Cy}^{I^{-1}}) \quad (14)$$

From $f_C^{-1}$ and the coordinates $(x_{ci}^o, y_{ci}^o)$, computed during the extract camera calibration data step, the mapping $f_W$ is obtained by concatenation as follows $f_W: (x_i^o, y_i^o) \rightarrow (x_{di}^o, y_{di}^o)$ where $(x_{di}^o, y_{di}^o)$ is given by equation (15).

$$(x_{di}^o, y_{di}^o) = f_C^{-1} f_F(x_i^o, y_i^o) = f_C^{-1}(x_{ci}^o, y_{ci}^o) \quad (15)$$

$$\text{Camera has perspective distortion} \begin{cases} x_{di}^o = f_{Cx}^{P^{-1}}(x_{ci}^o, y_{ci}^o) \\ y_{di}^o = f_{Cy}^{P^{-1}}(x_{ci}^o, y_{ci}^o) \end{cases}$$

$$\text{Camera has perspective + optical distortion} \begin{cases} x_{di}^o = f_{Cx}^{I^{-1}}(x_{ci}^o, y_{ci}^o) \\ y_{di}^o = f_{Cy}^{I^{-1}}(x_{ci}^o, y_{ci}^o) \end{cases}$$

The concatenation evaluates the camera inverse distortion map, using the full image map range, for its domain.

The obtained grid $(x_i^o, y_i^o) \rightarrow (x_{di}^o, y_{di}^o)$ corresponds to the middle diagrams in FIG. 5, and gives the required map (in inverse form) for correcting the display distortion. As previously mentioned, this grid only contains points that lie inside the viewing surface frame 18. For distortions that overflow (cases (a) and (b)), many pixels (corresponding to the shape centers) in the domain space (i.e. the input image from the viewpoint of display distortion) do not have their coordinates in the display space defined by this grid. The electronic correction unit, which in this exemplary embodiment is the digital warping unit 15, will process all domain space pixels; the domain space for an inverse architecture correction unit is actually the output image that is generated. Therefore the missing grid data needs to be computed, which is done by the extrapolate and re-sample steps.

As in computing the camera distortion, the grid $f_W$ can be either fit (in a least squares sense) or interpolated by a set of basis functions, such as splines. The fit or interpolant $\tilde{f}_W$ can be extrapolated to determine the missing data. This function can also be used to make the correction grid denser by re-sampling at a higher rate, that is, increasing the domain points from M×N to (nM−n+1)×(nN−n+1), n=2, 3, . . . .

The correction map can now be taken to be $\tilde{f}_W$, and the correction grid obtained by evaluating this function at any array of points on the input space, including missing points. To maintain the original grid $(x_i^o, y_i^o) \rightarrow (x_{di}^o, y_{di}^o)$ an interpolant form for $\tilde{f}_W$ is used by defining a new regularly spaced grid array on the input space as shown in equation 16.

$$\{(x_i, y_i)\}, i=1 \ldots \overline{M} \times \overline{N}, \text{ that includes the array } \{(x_i^o, y_i^o)\} \tag{16}$$

This array could be denser, with $\overline{M} > M$ rows and $\overline{N} > N$ columns. Evaluating $\tilde{f}_W$ on this array gives the revised correction grid $(x_{di}, y_{di})$ according to equation 17 which includes missing points and may be denser.

$$\tilde{f}_W : (x_i, y_i) \rightarrow (x_{di}, y_{di})$$

$$(x_{di}, y_{di}) = (x_{di}^o, y_{di}^o), \text{ if } (x_i, y_i) = (x_i^o, y_i^o) \text{ and } (x_{di}^o, y_{di}^o) \text{ inside display frame} \tag{17}$$

Combinations of fits and interpolants can also be used for $\tilde{f}_W$ to possibly provide a fit for missing data extrapolation and interpolant for interior data.

The final stage in the calibration data generation is fixing the scale and origin. The correction grid is in the display space and is defined relative to the top right corner of the viewing surface frame 18. The units (scale) of the display space are arbitrary and may be different then those used in the input space. Before this data can be used by the warp generator 13, the origin and scale need to be made consistent with that of the input space. This can be viewed as an optimization of the origin and scale.

Figure 7:
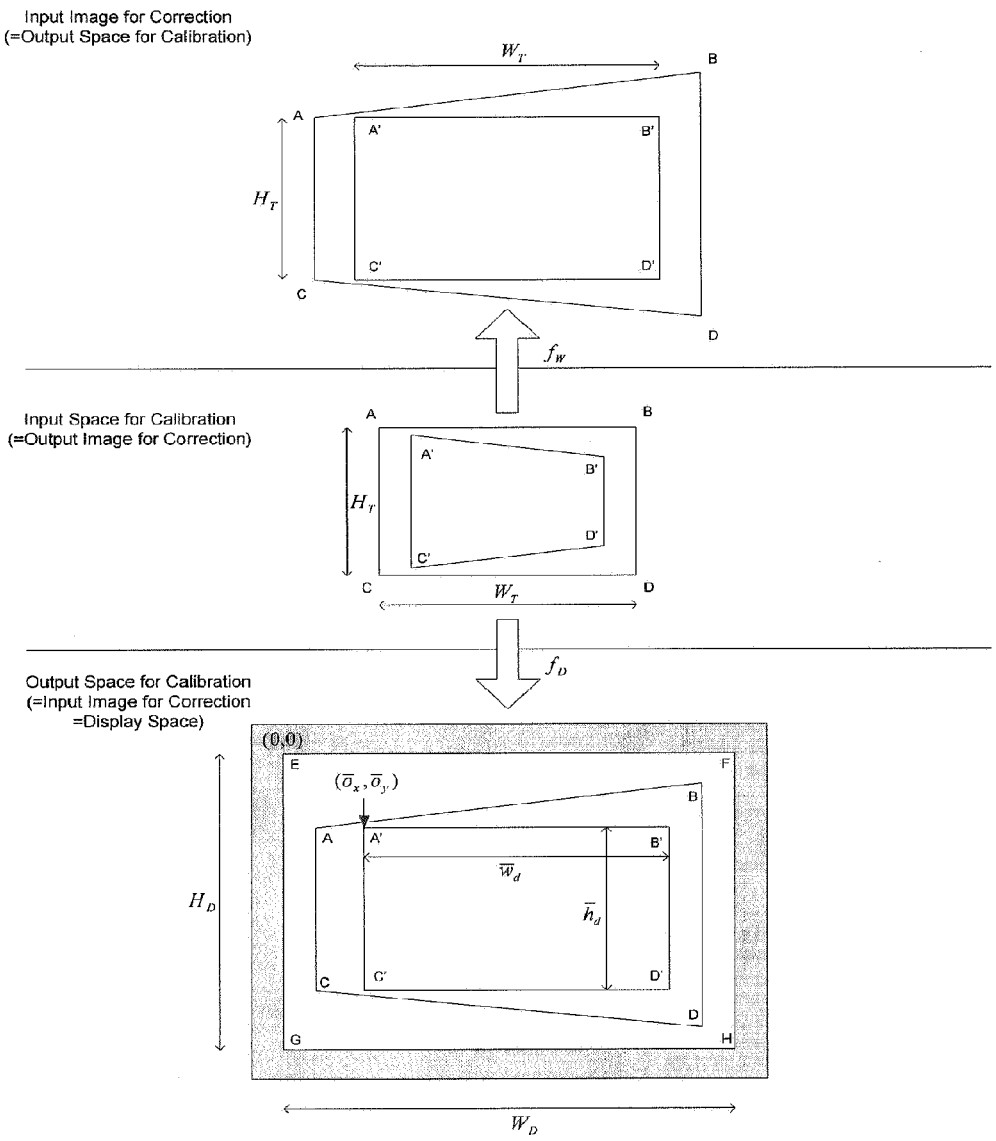
FIG. 7 is an illustration of optimization of the scale and origin.

Considering the middle diagrams of FIG. 5, when the correction is applied, the final corrected image should be rectangular relative to viewing surface frame 18. Referring to FIG. 7, this rectangle containing the corrected image will be referred to as the active rectangle A'B'C'D'. The active rectangle must lie inside the light envelope of the image (ABCD) and inside the viewing surface frame (EFGH). The origin and scale need to be selected such that the top left of the active rectangle corresponds to (0,0) and the width multiplied by the height of this rectangle is $W_T \times H_T$, which is the pixel resolution of the input image (see FIG. 7).

Note that the input space for calibration is actually the output image for electronic correction in an inverse architecture, and that the input image for the correction is actually equivalent to the display space (i.e. the output space for calibration), once the scaling and shifting has been done.

If the active rectangle's top left corner and dimensions, in the display coordinate space, are given by $(\overline{o}_x, \overline{o}_y)$ and $\overline{w}_d \times \overline{h}_d$ respectively, then all grid coordinates need to be scaled and shifted as shown in equation (18).

$$(x_{di}, y_{di}) \Rightarrow (x'_{di}, y'_{di}) \equiv \left( (x_{di} - \overline{o}_x) \frac{W_T}{\overline{w}_d}, (y_{di} - \overline{o}_y) \frac{H_T}{\overline{h}_d} \right) \tag{18}$$

The values for $W_D \times H_D$, which will determine the rectangle coordinate values, can be selected to be any integer values, provided they maintain the aspect ratio of the viewing surface frame 18. Applying equation (18) transforms the display space dimensions (bottom diagram) to the required input image dimensions for the correction (top diagram) in FIG. 7.

There is freedom in determining the active rectangle; however, certain natural constraints can be imposed to simplify the selection. In order to maximize the pixel resolution of the corrected image, the rectangle should be chosen to be as large as possible. The aspect ratio of the rectangle $(\overline{w}_d / \overline{h}_d)$ should match that of the input image $(W_T/H_T)$ if the corrected image is to have the same aspect ratio as that of the input image. The various constraints C1 to C4 are listed below.

C1) The active rectangle is contained within light envelope ABCD.
C2) The active rectangle is contained within viewing surface frame EFGH.
C3) The active rectangle area is maximized.
C4) The active rectangle aspect ratio is set equal to that of input image $(\overline{w}_d / \overline{h}_d = W_T/H_T)$ Solving these constraints for the active rectangle (i.e. determining $(\overline{o}_x, \overline{o}_y)$ and $\overline{w}_d \times \overline{h}_d$) becomes a problem in numerical optimization. All constraints above can be placed into mathematical form, which allows using various optimization methods to solve the problem.

One possible method is to use constrained minimization. This involves re-writing the constraints in equality or in-equality form and defining a function to be minimized (or maximized). Line equations to the frame edges (see equation (9)) and the outer most grid points (see equation (17)) can used to formulate constraints C1 and C2 into in-equality form, namely that the four rectangle corners lie within (<=) these lines. Constraint C4 is already in an equality form, whereas constraint C3 becomes the function to maximize, i.e. maximize the area of the active rectangle.

For scenario (a) in FIG. 5, where the image overflows to fill the viewing surface 16, the viewing surface frame 18 provides a natural rectangle that satisfies constraints C1 to C3 automatically. By fixing the scale of the display to that of the test image, parameters are set according to equation (19).

$$\overline{w}_d = W_D = W_T$$

$$\overline{h}_d = H_D = H_T$$

$$\overline{o}_x = \overline{o}_y = 0 \tag{19}$$

The corrected image will exactly match the viewing surface frame 18, which is the ideal situation in which the entire viewing surface frame 18 is used. Thus for this case, the optimization step in FIG. 6 simply means using equation (19), that is, the points need not be scaled or shifted.

The optimization step can also be used to achieve a change in aspect ratio, by modifying constraint 4 as shown in equation (20).

$$\overline{w}_d / \overline{h}_d = \alpha \tag{20}$$

Continuing to use equation (18), the aspect ratio of the corrected image will become α. This freedom in selecting the aspect ratio allows images to be letter-boxed or pillar-boxed in a display device that has a different aspect ratio. By adjusting the scale and shift, the image can also be over-scanned (i.e. image overflow) and under-scanned (i.e. image underscan) easily on the viewing surface 16. Accordingly, using surface functions makes for easy implementation of overscan and underscan conditions.

The final calibration data generated by the calibration data generator 12 is the grid data $\tilde{f}'_W$ given by equation (21).

$$\tilde{f}'_W : (x_i, y_i) \rightarrow (x'_{di}, y'_{di}) \tag{21}$$

The discussion above has focused on distortions where the correction is the same for all primary colors. In these cases, the same grid data describes the correction for all colors, this case can be referred to as single color correction. For lateral color distortions however, the grid data differs for all primary colors and multiple color correction is needed, this case can be referred to as multi-color correction. Any geometric distortion common to all primaries can be included in the lateral correction; hence the previous implementation of the calibration data generator 12 can be viewed as a special case of the multiple color correction described below.

Figure 8:
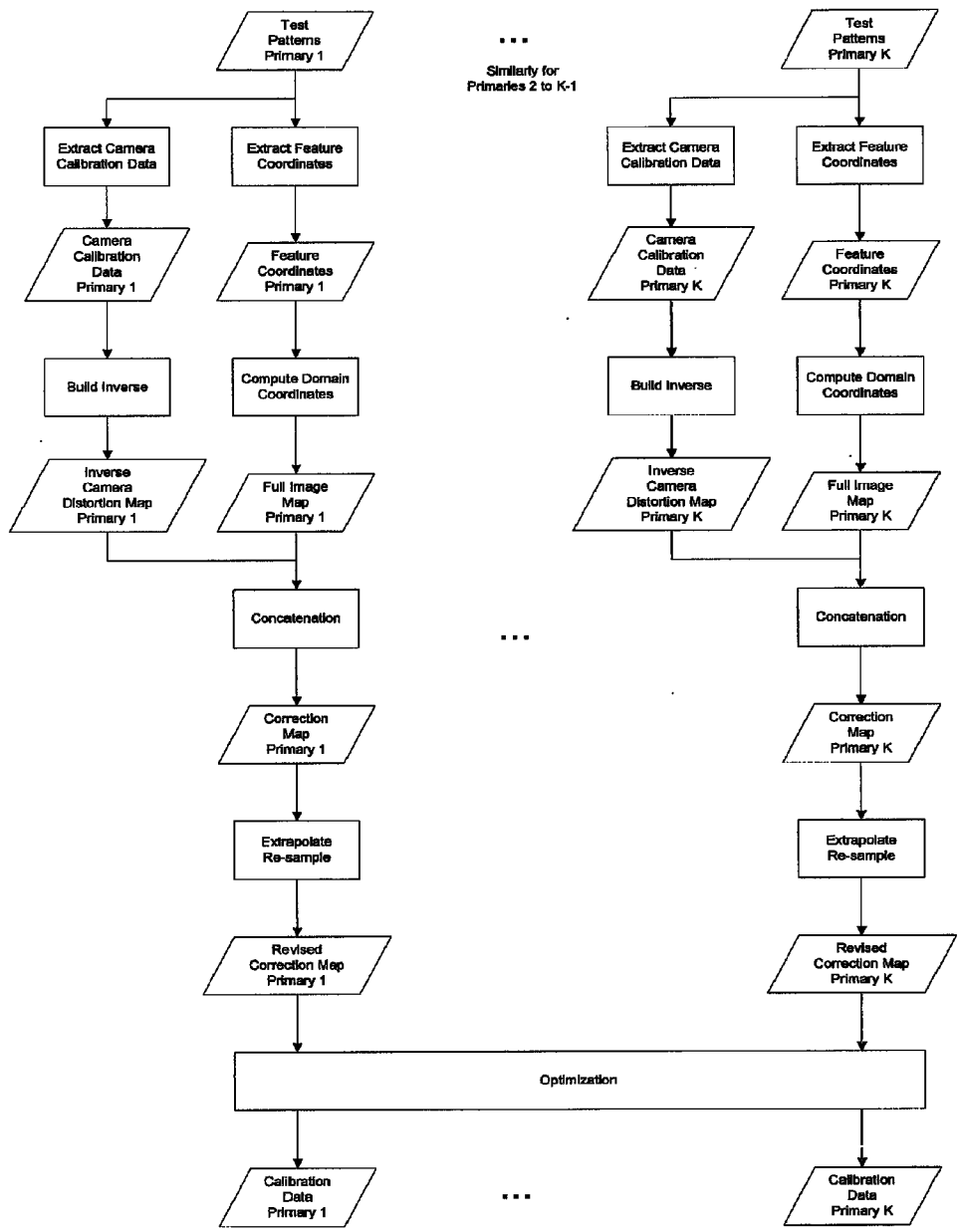
FIG. 8 is an illustration of an exemplary embodiment of a multiple color calibration data generator.

An exemplary implementation of the calibration data generator 12 for lateral color correction is shown in FIG. 8. As can be seen, this is similar to the implementation for the single color correction case (see previous section) repeated K times, where K is the number of primary colors. The primary colors are labeled $I_i$, i=1 . . . K. For the most common three primaries RGB, $(I_1, I_2, I_3)$=(R,G,B).

The steps and details for calibrating each primary color are identical to those described above for the single color correction case, with the following number of modifications.

The test patterns are now colored according to the primary color being calibrated. For example, when calibrating the color red, all test patterns (see FIG. 4, panels (a) to (j)), will have their features (circles, bars, etc.) colored red. The feature characteristics (number of circles, etc.) may differ for the color patterns.

All image processing steps, such as extracting centers and edges, will use color images. The threshold value can be adjusted to deal with the color being calibrated. Once a binary image is obtained, then the image processing is independent of the color.

In general, due to lateral color distortion in the camera lens itself, the camera calibration data differs for different primary colors and needs to be separately computed for all primary colors. The present system can be configured to correct for lateral color distortions in the camera itself. Test image patterns from different primary colors, similar to those for calibrating the display device, can be used to generate the camera calibration data. The (multiple color) calibration data generation of the camera can be done independently of the display calibration and needs to be done only once. In generating the camera calibration data, a display device that has zero or minimal (i.e. much less than that of the camera) lateral color distortion should be used. If such a display device is not available, then colored markers can be used to provide a physical grid with known coordinates. The final result for the multiple color camera calibration is an inverse camera distortion that depends on the primary color as defined in equation (22).

$$f_{Ck}^{-1}:(x_{ei}^{CCk}, y_{ei}^{CCk}) \to (x_{di}^{CCk}, y_{di}^{CCk}), k=1 \ldots K, \text{Fit or Interpolant to grid}$$

$$f_{Ck}^{-1} = (f_{Ckx}^{-1}, f_{Cky}^{-1}) = (f_{Ckx}^{-1}, f_{Cky}^{-1}) \quad (22)$$

After any missing data has been computed, the K grids obtained (analogous to equation (17)) are defined in equation (23).

$$\mathcal{J}_{Wk}:(x_i^k, y_i^k) \to (x_{di}^k, y_{di}^k)$$

$$k=1 \ldots K$$

$$i=1 \ldots \overline{M}_k \times \overline{N}_k \quad (23)$$

Here the number of points for each grid may differ, depending of test patterns used and any re-sampling made.

The test patterns for the primary colors may belong to different projection geometry classes (see FIG. 5). Some test patterns for the primary colors may overflow the viewing surface frame 18 completely as in panel (a) in FIG. 5, whereas others may lie entirely within the frame as in panel (b) in FIG. 5. When the optimization is performed, the active rectangle must lie within the viewing surface frame 16 and within the image envelope for each color, $ABCD_k$; the spatial intersection of the image envelopes is used. This means that a single optimization is made, with constraint 1 taking into account the envelopes $ABCD_k$ of all primary colors. The optimization determines coordinates for the active rectangle that are common to all primary colors. These coordinates are then used to scale and shift the grids according to equation (18).

The output of the optimization step is K grids, which give the calibration data for all primary colors as specified in equation (24).

$$\mathcal{J}'_{Wk}:(x_i^k, y_i^k) \to (x'_{di}^k, y'_{di}^k)$$

$$k=1 \ldots K$$

$$i=1 \ldots \overline{M}_k \times \overline{N}_k \quad (24)$$

These sets of data are used by the warp generator 13.

In the exemplary embodiment, the color and brightness, or simply color, non-uniformity calibration data generation is performed after the geometric distortions (types 1 to 4) have been corrected. Color non-uniformity can arise due to several sources, such as varying path length to the viewing surface 16 due to projection geometry (keystone angle), imperfections in the micro-display panel and the like.

For a geometrically corrected display device, the test pattern image appears as a rectangle (i.e. the active rectangle) within the frame 18, possibly matching it in size. The origin is taken to be the top left of the active rectangle rather than the top left corner of the viewing surface frame 18. The test patterns used are simply colored versions of those used above for the single color geometric correction; namely for correcting primary color k, the features (circles, bars) will be of color k. This is identical to what is used for correcting lateral color. For brightness, grey values (maximum white, half-maximum) can be used. The term color is used generally to identify any color component that is being corrected; it may be luminance, one component of RGB or $YC_bC_r$, or a component in any other color space that can be measured by the sensing device 11.

Figure 9:
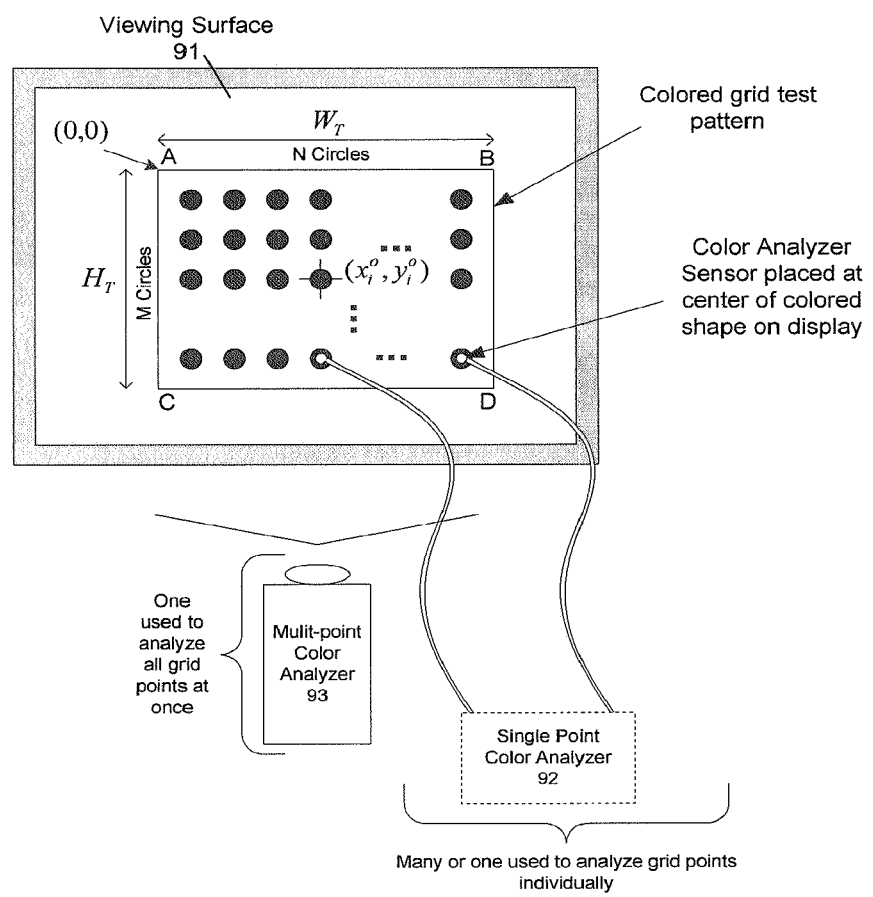
FIG. 9 is an illustration of the setup for color non-uniformity calibration.
Figure 10:
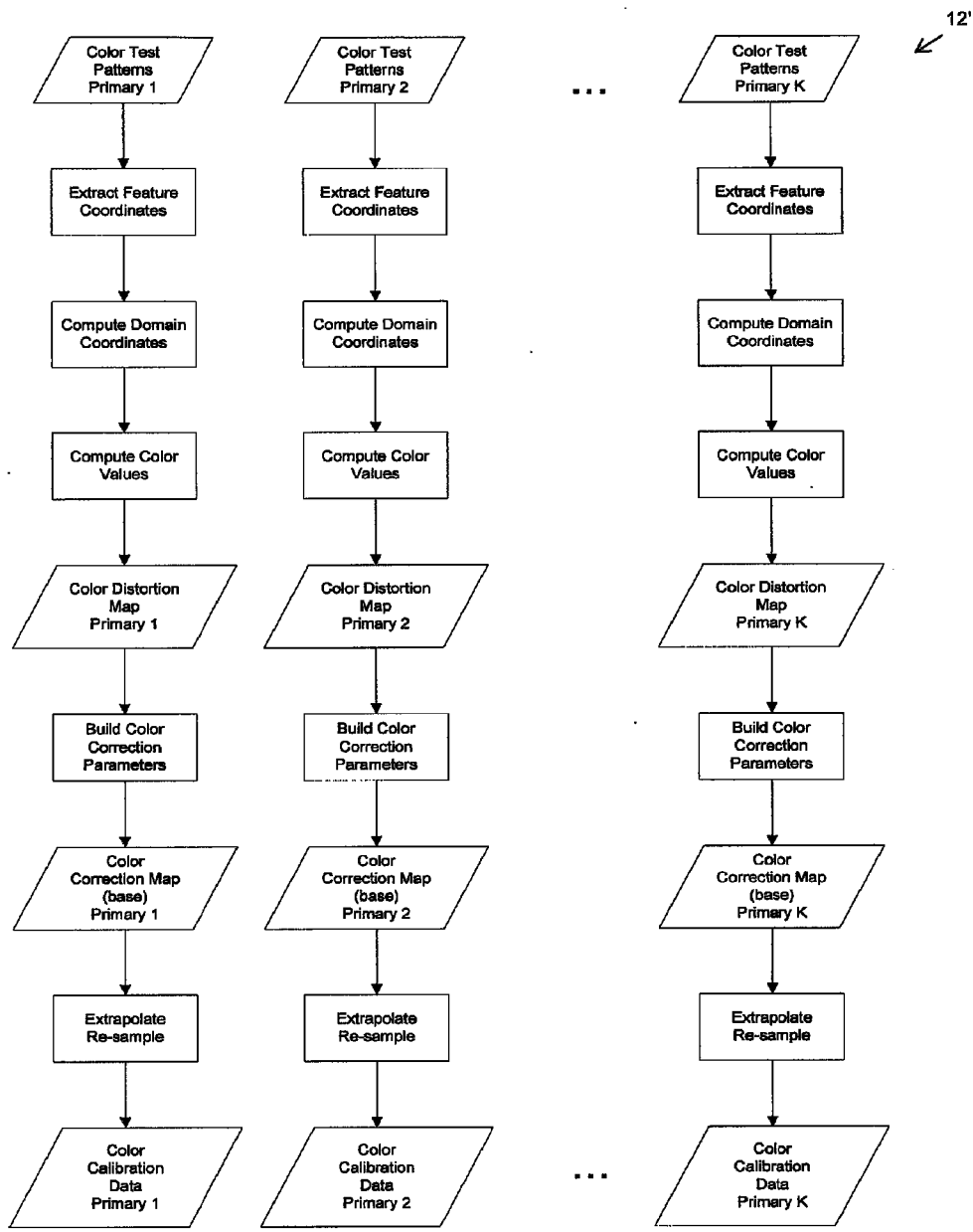
FIG. 10 is an illustration of an exemplary embodiment of the calibration data generator for color non-uniformity correction.

The sensing device 11 may be a camera or a color analyzer (i.e. spectrometer, photometer, and the like). For greater accuracy, a photometer or spectrometer should be used. These color analyzers may capture the entire image (i.e. multiple points) or data at a single point. The sensing device 11 should be placed as close to the viewing surface 16 as possible. Single point color analyzers will actually be placed on the screen at known coordinates (i.e. centers of the shapes), obtaining data for that coordinate. Although multi-point color analyzers and cameras can be placed at an arbitrary location, improved accuracy is obtained by placing them as close to the viewing surface 16 and as on center as possible. FIG. 9 illustrates an exemplary setup including viewing surface 91, single point color analyzer 92, and multi-point color analyzer 93. The calibration data generator for color non-uniformity is similar to that for correcting geometric distortions. FIG. 10 illustrates an exemplary embodiment of the calibration data generator 12' for color non-uniformity.

The data captured by the single point color analyzer 92 consists of the primary color value and the corresponding spatial coordinate $(x_i^o, y_i^o)$, for all the points at which the measurement was made. Here k=1 . . . K identifies the color being analyzed. The original color value, denoted $C_{ki}^o$, is also known since the test pattern is well defined. This results in equation (25) which is the grid data that describes the color non-uniformity distortion, referred to as a color distortion map.

$$f_{Dc}:(x_i^o,y_i^o,C_{ki}^o) \rightarrow (x_i^o,y_i^o,C'_{ki}{}^o) \qquad (25)$$

It should be noted that the spatial coordinates are not altered by the color non-uniformity distortion. The original color value $C_{ki}{}^o$ will usually be a fixed value, $C_{ki}{}^o = C_k{}^o$, for a given test pattern; this means that all non-background pixels are of the same color. More than one set of measurements $s=1 \ldots S$ may be made where each set corresponds to a test pattern with a different fixed color value (such as different levels of saturation or grey). To simplify the notation, the single index i will also range over different measurement sets as shown in equation (26).

$$i=1 \ldots M \times N \times S, \text{ with } (x_i^o,y_i^o) = (x_{i+(s-1)(M \times N)}^o, y_{i+(s-1)(M \times N)}^o) \qquad (26)$$

The spatial coordinates are the same for each set. The discussion below applies to each set (i.e. test pattern).

For the multi-point color analyzer 93, which can be a camera, the data captured corresponds to the entire image. In this case, some image processing needs to be done prior to obtaining the grid. The centers $(x_{ci}^o, y_{ci}^o)$ of the shapes and their domain coordinates $(x_i^o, y_i^o)$ are computed. The steps to do this are identical to the extraction and ordering steps used during geometric correction. In addition to the centers, the color value at the shape center is also computed. The color value can be obtained by averaging or filtering neighboring pixel color values in the captured image about the identified center according to equation (27)

$$C'^o_{ki} = \sum_{j \in \Gamma} a_j C'_{kj} \quad a_j = \text{filter coefficients} \qquad (27)$$

$$\Gamma = \text{neighborhood of } (x_{ci}^o, y_{ci}^o)$$

in which $C'_{kj}$ are the color values in the captured images in a neighborhood of the center. For averaging over the nearest four points, the filter coefficients are $a_j=1/4, j=1 \ldots 4$.

The end result is the grid data defined in equation (25). It should be noted that: (i) only the domain coordinates are needed since the color distortion does not change spatial coordinates; (ii) there is no missing data since the image is geometrically distortion free and within the viewing surface 16; and (iii) there is no need to compute the sensing device distortion and perform concatenation since there is no geometric correction being done.

Depending on the type of sensing device that is used and the format of the data captured, a color space transformation may be necessary to bring the color data to the color space of the display. For example, a spectrometer may give data in terms of chromaticity values whereas the display device and electronic correction unit (which is a processor) requires RGB values. A color transformation may be performed by a matrix multiplication or through a more complicated non-linear equation. For a color space conversion, the grid data for all of the primary colors is used. In general, this transformation takes the form shown in equation (28).

$$C'_{ki}{}^o \Rightarrow C'_{ki}{}^o = F_k(C'_{1i}{}^o, C'_{2i}{}^o, \ldots, C'_{Ki}{}^o) \qquad (28)$$

If no color distortion was present, then for a fixed color test pattern, the color value at all coordinates $(x_i^o, y_i^o)$ should be measured as a constant $C'_k{}^o$. The measured constant may not be equal to the original constant pixel value $C_k{}^o$. For most displays, the measured value and original value are proportional, where the constant of proportionality $\lambda$ is constant when there is no color distortion and varies spatially when there is color distortion. Therefore the color distortion map of the display can be expressed as shown in equation (29).

$$C'^o_{ki} = \lambda(x_i^o, y_i^o) C_{ki}^o \Rightarrow \lambda(x_i^o, y_i^o) = \frac{C_{ki}^o}{C'^o_{ki}} \qquad (29)$$

In general, the input and measured color values will be related by some known display color function $f_I$ given in terms of $\vec{\lambda}$ which is a vector of parameters as shown in equation (30).

$$C'_{ki}{}^o = f_I(\vec{\lambda}, C_{ki}^o) \qquad (30)$$

If there is color distortion, then $\vec{\lambda}$ varies spatially. The parameters at a given coordinate $(x_i^o, y_i^o)$ can be determined by analyzing the data for the different sets $s=1 \ldots S$ as shown in equation (31) in which the s index is explicitly shown.

$$(x_i^o,y_i^o,C_{kis}^o) \rightarrow (x_i^o,y_i^o,C'_{kis}{}^o), s=1 \ldots S \qquad (31)$$

A sufficient number of values at each coordinate are needed. The analysis may approximate $f_I$ by making a fit to the data. Similarly, the inverse $f_I^{-1}$ can be computed by analyzing the same data in the inverse direction as shown in equation (32).

$$(x_i^o,y_i^o,C'_{kis}{}^o) \rightarrow (x_i^o,y_i^o,C_{kis}^o) \Rightarrow C_{ki}^o = f_I^{-1}(\vec{\lambda}', C'_{ki}{}^o) \qquad (32)$$

The inverse also depends on some parameters $\vec{\lambda}'$, called color correction parameters, which can be determined from the explicit form of $f_I$, if known, or computed from a fit to the inverse data using a specific basis function, such as polynomial functions. For a linear least squares fit, the inverse map takes the form shown in equation (33).

$$f_I^{-1}(\vec{\lambda}'_{ik}, C'^o_{ik}) = \sum_r \lambda'_{ikr} B_r(C'^o_{ik}), r = 1 \ldots R \qquad (33)$$

Here $r=1 \ldots R$ gives the number of parameters defining the inverse color map and $B_r$ are the basis functions. The parameters differ for each center coordinate and for each primary color. Normally, $f_I^{-1}$ will be determined by the representation used by the electronic correction unit, which without loss of generality can be assumed to be polynomial-based. The representation above also allows for adjusting the final fixed color level since in some cases it may be necessary or desired to reduce the original $C_{ik}{}^o$ value at the output. Here the parameters can be adjusted, by a simple scale factor, to increase or decrease the inverted value.

Once the inverse function (at each center coordinate) is known, the correction color map that corrects the color non-uniformity distortion is given by equation (34).

$$(x_i^o,y_i^o,C_{ki}^o) \rightarrow (x_i^o,y_i^o,f_I^{-1}(\vec{\lambda}',C_{ki}^o)) \qquad (34)$$

The spatial variation of the color distortion and correction is entirely described by the parameters $\vec{\lambda}$ and its inverse $\vec{\lambda}'$, respectively. Therefore the (base) calibration data for the correction, labeled $f_{Wck}$, fully describes the grid data associated with the color correction parameters according to equation (35).

$$f_{Wck}:(x_i^o,y_i^o) \rightarrow \vec{\lambda}'_{ik} \qquad (35)$$

For the most common case of equation (29), the parameters are given according to equation (36).

$$\vec{\lambda}'_{ik} \equiv \lambda'_{ik} = \frac{C'^o_{ik}}{C^o_{ik}} \quad (36)$$

The above grid may be made denser by re-sampling with an appropriate fit or interpolating function. The new grid, using a notation analogous to that for the geometric calibration, is given by equation (37).

$$\vec{\mathcal{F}}_{Wck}:(x_i^k, y_i^k) \to \vec{\lambda}'_{ik} = \{\lambda'_{ikr}\}$$

$k = 1 \ldots K$ $i = 1 \ldots \overline{M}_{ck} \times \overline{N}_{ck}$ $r = 1 \ldots R \quad (37)$ This is the data output of the calibration data generator 12'.

The complete data output by the calibration data generator 12', including all sub-generators (i.e. each column in FIG. 10), is given by equation (38).

$$\vec{\mathcal{F}}_{Wk}:(x_i^k, y_i^k) \to (x'^k_{di}, y'^k_{di})$$

$$\vec{\mathcal{F}}_{Wck}:(x_j^k, y_j^k) \to \vec{\lambda}'_{jk} = \{\lambda'_{jkr}\}$$

$k = 1 \ldots K$ $i = 1 \ldots \overline{M}_k \times \overline{N}_k$ $j = 1 \ldots \overline{M}_{ck} \times \overline{N}_{ck}$ $r = 1 \ldots R \quad (38)$ If there is no lateral color, then the K grids $\vec{\mathcal{F}}'_{Wk}$ are identical, that is, only one geometry correction grid is computed and output. The calibration data is input to the warp generator 13.

As previously mentioned the grid data is not directly used by the electronic correction unit. Although a grid representation is the most general format, it is inefficient for a hardware implementation primarily because it requires storage of large amounts of data (coordinates for every pixel) and cannot easily be manipulated (such as for a change in scale). Certain prior art systems use a look-up table, which by the same token is not optimal. The warp generator 13 transforms the grid representations defined in (38) into warp data, which is an alternative representation of the correction, in a form that is efficient for application in hardware. If the electronic correction unit can use grid data directly, then the above grids, re-sampled for all pixels, can be used and there is no need for the generation of warp data by the warp generator 13.

Figure 11:
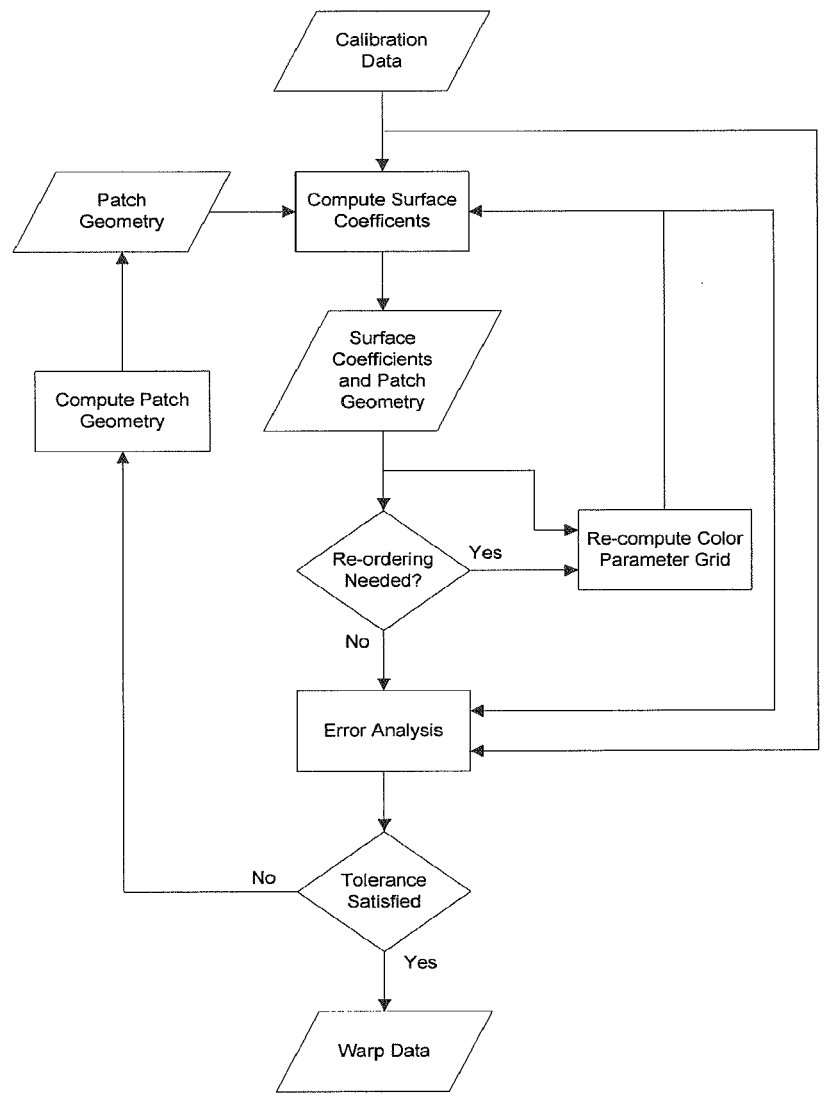
FIG. 11 is an illustration of an exemplary embodiment of a warp data generator.

The warp data is generated in accordance with the data requirements of the electronic correction unit. An electronic correction unit can apply geometric and color transformations using various architectures. Most units use inverse maps for geometric correction and the above grids are designed for an inverse architecture. An efficient electronic correction architecture, such as that described in published US patent application US 2006-0050074 A1 entitled "System and method for representing a general two dimensional transformation", is based on a linear functional representation of the grid data. The warp generator 13 converts the grid data into a functional representation. FIG. 11 illustrates an exemplary embodiment of the warp generator 13.

A general functional representation of a two-dimensional grid $(x_i, y_i) \to u_i$ can be written as shown in equation (39).

$$u = \sum_{i=1}^{L} a_i B_i(x, y) \quad (39)$$

Equation (39) defines a two dimensional surface function over the domain (x, y), that is a linear combination of the basis functions $B_i(x, y)$, $i = 1 \ldots L$, with the coefficients of the combination, called the surface coefficients, given by $a_i$. The coefficients are constant and do not vary over the domain. The basis functions need not be linear; only their combination is linear. In at least some cases, the basis functions can be very non-linear; hence, the form shown in equation (39) is sufficiently general to represent the correction grids. The basis functions, and their number, are defined by the electronic correction unit as they are implemented and evaluated in hardware. The warp generator 13 determines the required coefficients.

In one exemplary embodiment, the basis functions used in hardware is polynomial-based. Introducing two indices, a polynomial basis function and the corresponding surface can be written as shown in equation (40).

$$B_{ij}(x, y) = x^i y^j \quad (40)$$

$$u(x, y) = \sum_{i,j} a_{ij} x^i y^j, \, i = 0 \ldots L_x, \, j = 0 \ldots L_y$$

Since the basis functions are known, the new data to determine and store is the set of surface coefficients $a_i$. Moving to a surface representation means a transformation from grid values to surface coefficients as shown in equation (41).

$$u_i \Rightarrow a_i \quad (41)$$

The efficiency of the representation results from the fact that where a grid value needs to be stored for each pixel, the surface coefficients allow for the computation of the grid values over a group of pixels; hence a comparatively much smaller number of the surface coefficients need to be stored.

The number of coefficients determines how accurately the original grid values can be represented. Increased accuracy can be obtained by increasing the number of coefficients, i.e. by using more basis functions. Alternatively, a small number of basis functions can be used if the domain is divided into patches, with a different surface function used for each patch. The patch structure is built according to the severity of the display distortion in each patch. This approach allows greater flexibility in matching the complexity of the combined surface to the distortion. For instance, the more complex a distortion, the more patches that are used. The coefficients for patch $p = 1 \ldots P$, are labeled as $a_{ij}^p$. In what follows, without loss of generality, the notation for a polynomial form will be used, which can easily be adapted to another basis. The complete surface then takes the form specified in equation (42).

$$u(x, y) = \sum_{i,j} a_{ij}^p x^i y^j \quad (42)$$

Figure 12:
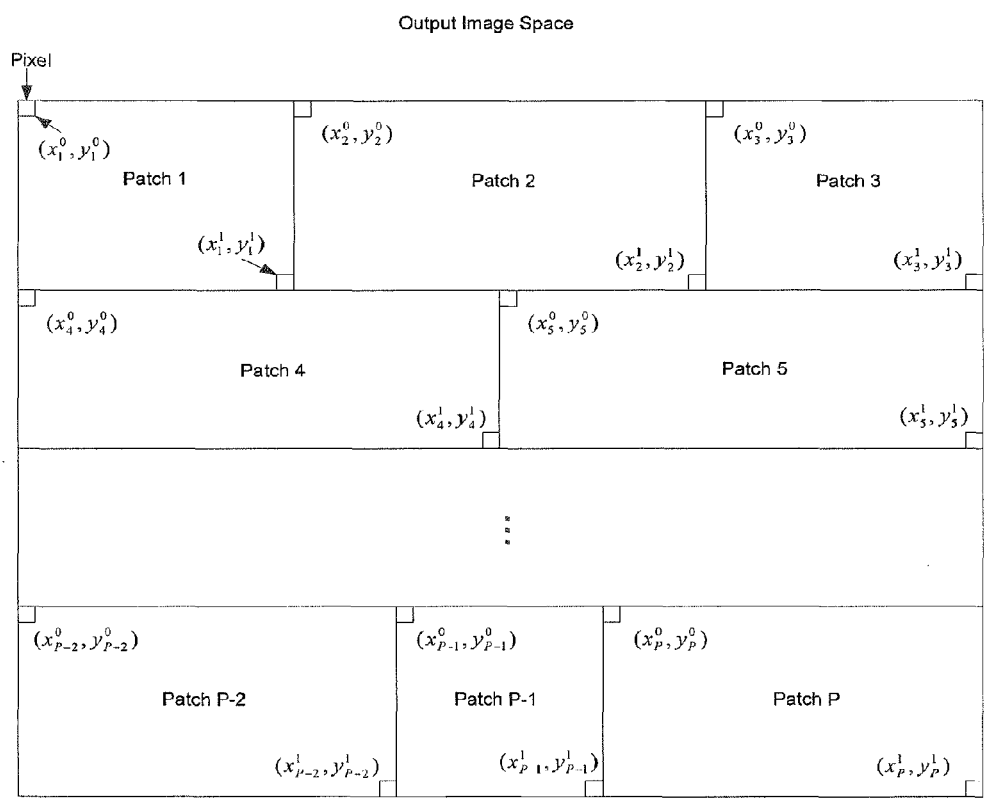
FIG. 12 is an illustration of patch division for display correction.

$i = 0 \ldots L_x, \, j = 0 \ldots L_y$ $p = 1 \ldots P$ $(x, y) \in \text{Patch } p$ A single surface corresponds to a single patch that is equal to the entire output image (domain). An exemplary patch division is shown in FIG. 12.

The patch division can be initialized to some starting configuration, such as 16 patches in a 4×4 symmetric arrangement. The arrangement of the patches (i.e. the number of patches and the boundaries of each patch) is referred to as the patch geometry, D, which takes the form specified in equation (43).

$$D = \{x_p^0, y_p^0, x_p^1, y_p^1\}, p = 1 \ldots P$$

$$\text{Patch } p = \{(x,y) | x_p^0 \le x \le x_p^1, y_p^0 \le y \le y_p^1\} \quad (43)$$

Given a patch geometry, the coefficients can be computed using a linear least squares fitting of the data according to equation (38). The fitting should be constrained to ensure that at patch boundaries, the surface is continuous. Once the surface is determined, an error analysis is made to compare the grid values with the computed values as shown in equation (44).

$$\text{Error}_i = |u_i - u(x_i, y_i)| \quad (44)$$

The error values are compared with a tolerance level $E_{max}$. If the maximum error is less than or equal to the tolerance level, i.e.

$$\max_i (\text{Error}_i) \le E_{max},$$

the surface coefficients are retained and output from the warp generator 13 as the warp data. If the maximum error is greater, the patch geometry is refined by further sub-dividing, and the coefficient re-computed and re-analyzed for error.

The surface representation in equation (38) can be written as shown in equation (45).

$$u_k(x, y) = \sum_{i,j} a_{ij}^{k,p} x^i y^j$$

$$v_k(x, y) = \sum_{i,j} b_{ij}^{k,p} x^i y^j \quad (45)$$

$$\vec{\lambda}_k''(u, v) = \sum_{i,j} \vec{c}_{ij}^{k,p} u^i v^j$$

$$k = 1 \ldots K$$

$$p = 1 \ldots P_k$$

$$i = 0 \ldots L_x^k, j = 0 \ldots L_y^k$$

It should be noted that the (i, j) indices in the grid representation are no longer needed as the functional form is defined for the entire space and not simply at a discrete set of coordinates. The indices (i, j) now give the exponents, or more generally identify the basis function. The index k identifies the primary colors and the index p identifies the patch. The surface is evaluated for the patch in which the domain coordinate lies. The patch arrangement, and number of basis functions can differ for the primary colors. Additional variation of the above format can be obtained by varying the basis functions per patch, for example. The domain space for the geometric correction has been labeled as (x, y), and it corresponds to the output image space (in an inverse architecture), and the range space has been re-labeled as (u, v) and it corresponds to the input image space.

For the color correction, the domain space has been re-labeled as (u, v). The color correction operates on an image that is geometrically correct. This means that the color correction must be applied to the input image, with coordinate space (u,v), before it has been warped to correct for geometry. If the electronic correction unit applies the color correction after the image has been warped to correct for geometry, then the above coefficients need to be adjusted for this new ordering of applying the corrections, i.e. a re-ordering step is required. In this case the color parameters are defined in the (x, y) space. First a new grid, $\vec{\lambda}'_{tk}$, can be obtained defined on the (x, y) space from the above surfaces as shown in equation (46).

$$\vec{\lambda}'_{tk} = \sum_{i,j} \vec{c}_{ij}^{k,p} (u_k(x_t^k, y_t^k))^i (v_k(x_t^k, y_t^k))^j, \, t = 1 \ldots T_k \quad (46)$$

$$\Downarrow$$

$$(x_t^k, y_t^k) \to \vec{\lambda}'_{tk}$$

This grid can then be fitted as was mentioned above and the coefficients computed, with the domain space now being the output image space. The same notation is used for the color correction surface coefficients. The error analysis will now use the re-ordered grid above.

The final output of the warp generator 13 is the set of coefficients in equation (47) (adjusted for order if necessary) which collectively forms the warp data.

$$\{a_{ij}^{k,p}, b_{ij}^{k,p}, \vec{c}_{ij}^{k,p}, D^k\}$$

$$k = 1 \ldots K$$

$$p = 1 \ldots P_k$$

$$i = 0 \ldots L_x^k, j = 0 \ldots L_y^k \quad (47)$$

The term $D^k$ contains all information defining the patch geometry for the primary color k. The (a, b) data is the geometric warp data or transformation, which corrects distortions of type 1 to 4, and $\vec{c}$ is the color warp or transformation that corrects distortion of type 5.

The digital warping unit 15 is a processor and acts as an electronic correction unit of the system. The term electronic correction unit is used herein interchangeably with the term digital warping unit. In actual use, the digital warping unit 15 applies the warp data to the digital input image (video), in order to pre-distort, or warp the input images. The input images are warped in both spatial space and color space. The spatial warping is done according to the geometric warp and the color warping according to the color warp. The pre-distortion is built so as to cancel the distortion of the display, giving a distortion-free image that is displayed on the viewing surface 16.

Figure 13:
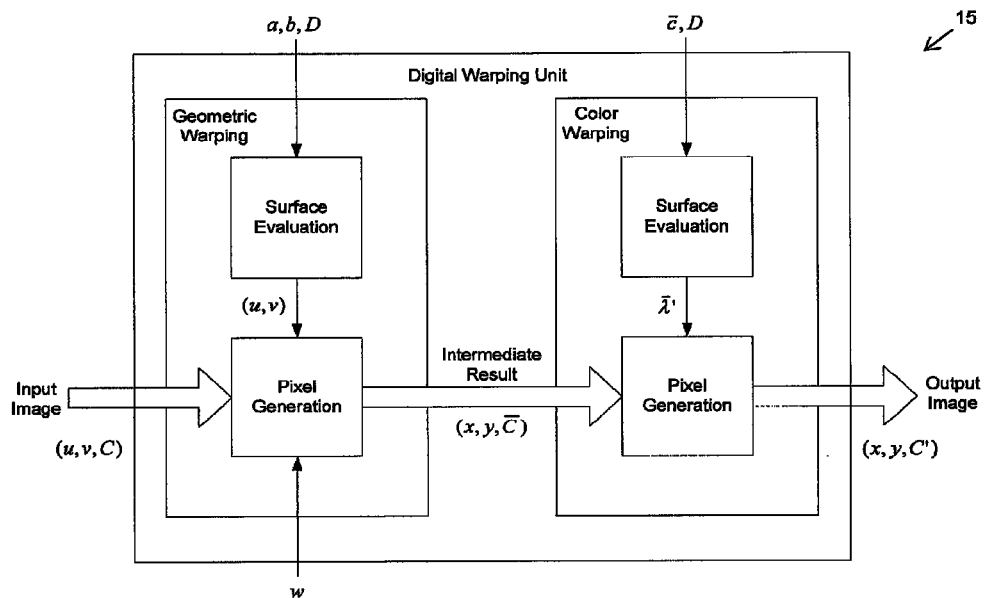
FIG. 13 is an illustration of an exemplary embodiment of the digital warping unit.

An exemplary embodiment of the digital warping unit 15, that corrects both geometry and color non-uniformity, is shown in FIG. 13 (indices are omitted in this figure). The digital warping unit 15 includes two main blocks: a first block that applies the geometric warp (i.e. warps the input images geometrically) and a second block that warps the input images in color space only to correct for color non-uniformity. Here the color correction occurs after the geometric correction however the discussion is easily adapted for the reverse order. Both blocks can be by-passed when a specific correction is not required. Each block in turns has two components. A surface evaluation component, which evaluates the surface polynomials defined in equation (45) at each pixel $(x_i, y_i)$, for each primary color (this index is omitted), to generate the required coordinates $\{u_i, v_i, \vec{\lambda}'_i\}$, and a pixel generation component that actually uses the required coordinates to compute the pixel color value $C_i$. For the geometric correction, the pixel generation is a filtering step, where a filter with pre-computed coefficients, denoted $w_j$, $j=1 \ldots W$, is applied to some neighborhood of pixels about the current pixel $(u_i, v_i)$ being processed.

In at least some cases, the filter coefficients are computed outside of the system and loaded into the digital warping unit 15. For the color non-uniformity correction, the pixel generation will take the pixel values from the geometrically warped image and apply equation (33) to determine the new color value. The pixel generation steps are summarized in (48).

$$\overline{C}_i = \sum_{j \in \Gamma} w_j C_j, \quad (48)$$

$\Gamma = $ neighborhood of $(u_i, v_i)$ $$C'_i = \sum_r \lambda'_{ir} B_r(\overline{C}_i),$$

$r = 1 \ldots R$

These steps are executed for each primary color. The $\overline{C}_i$ represents the intermediate color value, after geometric correction.

The details of the filtering and color correction equations depend of the architecture of the hardware. A simple filter may simply average four nearest neighboring points in which case $w_j=1/4$. A complicated filter may use an elliptical neighborhood, whose shape depends on the local Jacobian of the surface and the filter coefficients can be obtained using sophisticated filter generation algorithms. In this case the neighboring coordinates $(u_{j \in \Gamma}, v_{j \in \Gamma})$ may be needed to estimate the Jacobian. Similarly a simple color correction involves using only a linear correction as defined in equation (49).

$$C'_i = \lambda'_{i2} \overline{C}_i + \lambda'_{i1} \quad (49)$$

Alternatively, a complicated color correction may be used which uses a cubic polynomial equation as defined in equation (50).

$$C'_i = \lambda'_{i4}(\overline{C}_i)^3 + \lambda'_{i3}(\overline{C}_i)^2 + \lambda'_{i2}(\overline{C}_i) + \lambda'_{i1} \quad (50)$$

The color parameters ($\vec{\lambda}'$) and surface coefficients are computed knowing the architectural details of the digital warping unit 15.

The final result of the digital warping unit 15 is the correction described mathematically by equation (1) re-written below in equation (51) using vector notation used to denote all primary components.

Input Image ⇔ Output Image $$(u_i, v_i, \vec{C}_i) \Leftrightarrow (x_i, y_i, \vec{C}'_i) \quad (51)$$

The warped or pre-compensated output image is input to the display device (not shown), where it is projected onto the viewing surface 16 visually distortion free, therefore completing the automated calibration and correction. Once the calibration and correction procedure is complete, normal (non test patterns) images and video can be sent to the display device.

The multi-color geometric calibration and correction has been discussed in conjunction with lateral color correction. However, it can be used to calibrate and correct any distortion in which the primary components are geometrically distorted. Other applications include distortions due to misalignment and misconvergence of optical components due to multiple micro-display devices positioned relative to each other or relative to the chassis or housing in a rear projection display device as well as differing magnification for the color components.

In projection systems, the color calibration and correction is made on a geometrically corrected image. This means that the color correction also takes into account any non-uniformity introduced by the geometric warping itself. A geometrically warped image will have different areas containing different color or luminance content due to the scaling and filtering process. In fact, the more a region is scaled, the greater the change in brightness and color. This is automatically compensated by the color correction made after the geometric warping. Therefore the system automatically compensates for color non-uniformity due to the geometric warping process.

In another adaptation, the system can be integrated inside a single circuit, to obtain a digital calibration and warping unit. The calibration data and warp generators 12 and 13 are components which can be executed on any processor. The test image generator 14 can also be replaced by a set of stored images that are output by the processor. Using an embedded processor in the hardware gives a single circuit solution to the entire calibration and correction process. Furthermore, this hardware can be integrated inside a display device, along with the camera, to obtain a self-calibrating display device. In this adaptation, only one processor is needed to receive sensed information from at least one image sensing device and to compute the display distortions, to generate pre-compensating maps, i.e., warp maps and color maps (also referred to as geometry warp and color warp), and to apply the pre-compensating maps to input image data such that a resulting displayed image on the viewing surface would be substantially distortion free. However, in other cases, it can be more efficient to use more than one processor. Accordingly, at least one processor is needed to implement the embodiments described herein.

Figure 14:
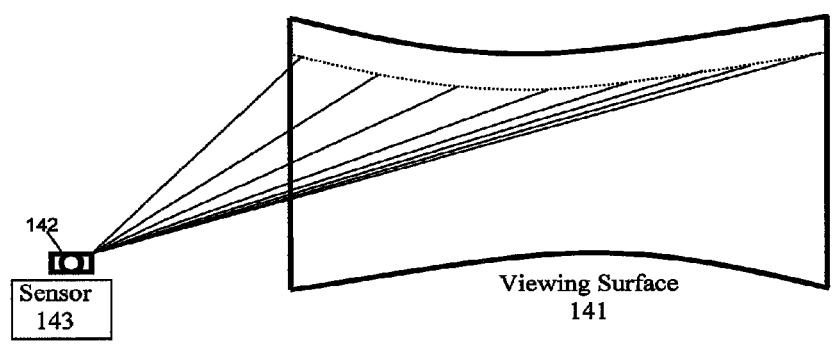
FIG. 14 is a schematic illustration of a setup for determining shape and relative orientation of a viewing surface.

Various types of sensors can be integrated into the display device (rather than or along with the cameras) to function as the sensing devices 11. In one exemplary embodiment, shown in FIG. 14, sensor 143 is a distance sensing device which is used independently or alongside a camera 142 to measure the distance of a certain number of points on viewing surface 141. This plane need not be flat. From the measured distances and the angles of the sensed distances relative to one-another, the relative angle of the camera 142 and the viewing surface 141 is computed. In addition, the shape of the screen, if not flat, could also be computed using this method. In the example shown in FIG. 14, denser lines on the right side of the screen would indicate a closer to normal view of the screen by the sensor 143, while the less dense pattern on the left indicates a farther than normal view on the left. Various types of sensors 143 can be used including infrared sensors, and the like. In this exemplary embodiment, a physical structure is not needed to delineate the display screen (i.e. viewing surface 141) and the camera 142 can be placed arbitrarily.

Another exemplary embodiment constitutes a self-calibrating display device with dynamic calibration and correction, whereby the calibration and correction procedure, without requiring external resources, can be run at any time to correct for distortions. This allows for correcting distortions that may vary over time, such as keystone distortion for a projector, or field calibration of rear projection display devices like RPTVs. The calibration system is disposed inside the housing or chassis of the RPTV to provide self-calibration in this case. Other important distortions that change over time are variations in optical components due to physical movement, age and temperature. For example, in a rear projection display device, a mirror's curvature may change slightly due to its weight or temperature, which requires dynamic calibration and correction. When the display device is turned on or a change in the distortion is detected, the calibration and correction system is executed.

Dynamic calibration and correction becomes especially important in the field for fixed display devices, such as television systems, where a sensing device may not be available. Here, after the initial calibration and correction, future distortions are due to small variations in components over time. In a controlled setting, such as the manufacturing factory, the digital warping unit can be used to simulate various distortions, i=1 . . . N, expected in the field over time. These distortions can then be calibrated and corrected for using the systems described in the aforementioned exemplary embodiments; however, two electronic correction units may be used, one to simulate distortion and the other to test the correction data that is automatically generated. The warp data for the corrections for these N test cases can be stored inside the display device. In the field and over time, as minor distortions develop, from the N warp corrections, one is selected that best corrects the distortion. Accordingly, the complete system is not required, only the digital warping unit needs to be built in the display device since calibration is done during manufacturing and the N sets of correction data are stored in the display device. To automate the selection of the appropriate correction data, sensors in the display bezel can be used to detect specialized test patterns. The image test pattern for which optimal detection of distortions is achieved is therefore loaded. This process can run when the display device is turned on to obtain dynamic correction and calibration.

Figure 15:
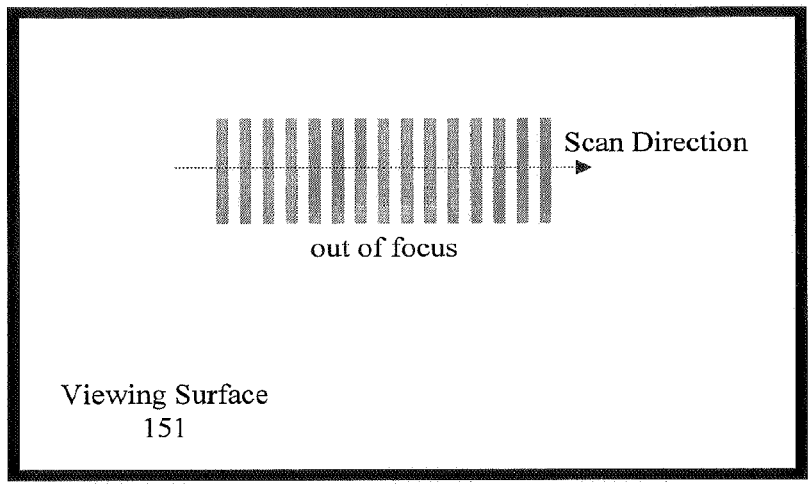
FIG. 15 is an illustration of an out of focus test pattern.
Figure 16:
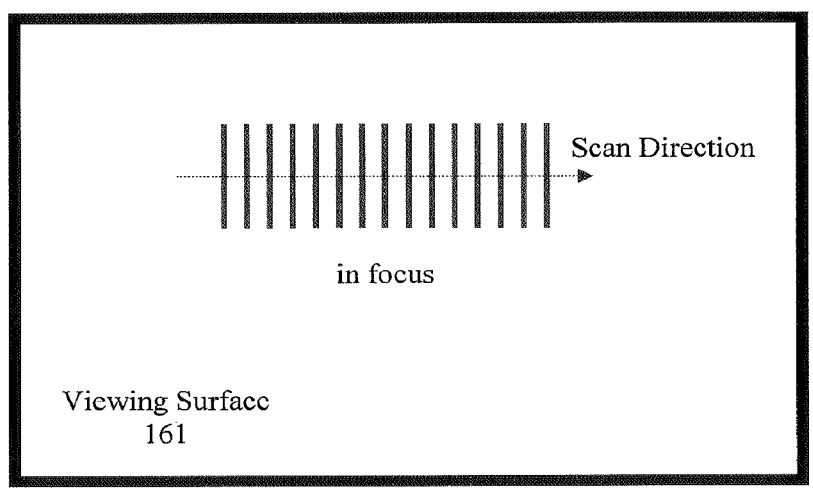
FIG. 16 is an illustration of an in focus test pattern.

As shown in FIGS. 15 and 16, in one exemplary embodiment, the calibration system is adapted to find the optimal projector focus on a viewing surface. This is done by displaying a test pattern on the viewing surface such as a set of specific number of parallel lines. The image is then captured and is scanned by the electronic correction unit to find the contrast between the dark and bright areas in the test patterns. The projector focus is then shifted and the contrast is re-measured. This is continued until the maximum contrast is found. The maximum contrast corresponds with the best focus. This is shown on viewing surface 151 with poorer focus and on viewing surface 161 with better focus. The same technique can be used to focus the sensing device. Physical markers with sharp edges, such as the bezel of the display screen (i.e. viewing surface), are captured and analyzed for maximum contrast. If necessary, an appropriately colored test pattern can be displayed to enhance the contrast between the markers and background. The sensing device focus is shifted and the contrast re-measured. The setting of maximum contrast provides the best focus for the sensing device. The sensing device is focused prior to focusing the display device.

Figure 17:
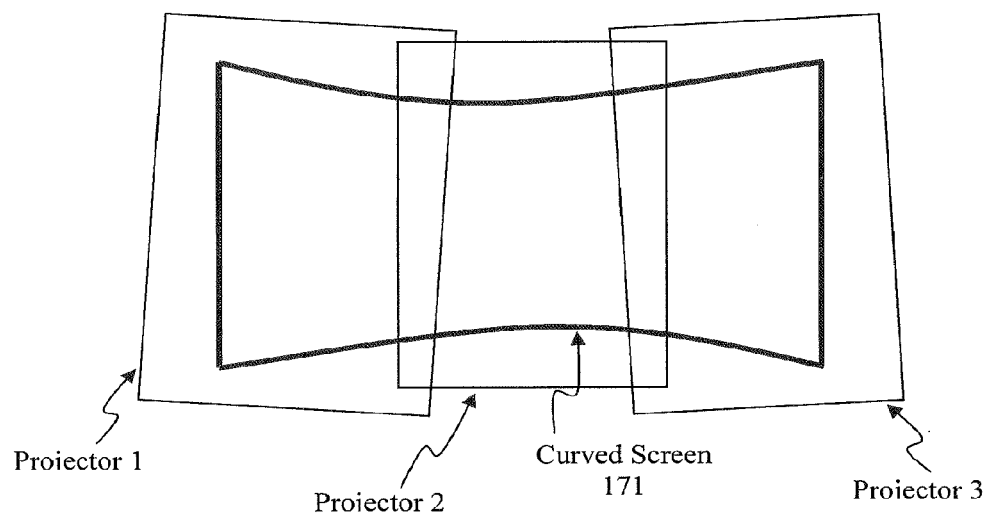
FIG. 17 is a partial illustration of an exemplary embodiment of a calibration system consisting of multiple projectors and a curved screen.
Figure 18:
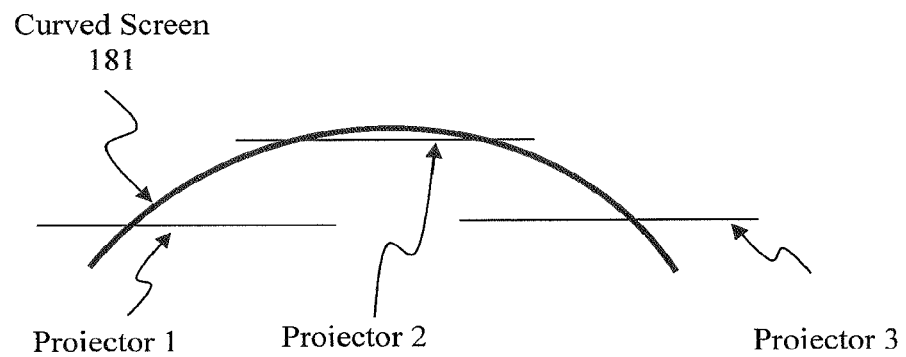
FIG. 18 is a partial illustration of the calibration system consisting of multiple projectors and a curved screen of FIG. 17 showing the focal planes of the different projectors.

In another exemplary embodiment, partially shown in FIGS. 17 and 18, the calibration system is used in a display device with a curved screen 171 and 181 respectively and multiple projectors 1 to 3. The projectors span the entire area of the curved screens 171 and 181 and they are controlled by the same electronic unit. The geometric calibration is done for each projector 1 to 3, mapping onto the respective area of the screens 171 and 181. The geometry calibration, in addition, rotates and translates each projector image to stitch it to an adjacent projector image. In particular, in the overlapping areas, the corresponding pixels are overlaid on top of each other. It should be noted that the mappings on the screens 171 and 181 from the different projectors 1 to 3 have different incident angles and varies as the screens 171 and 181 curve. The electronic unit, having or obtaining a map of the curved screens 171 and 181, as represented by the warp data, corrects for the angular variations across the screens 171 and 181.

In addition to geometry calibration, color calibration of each projector 1 to 3 is done to ensure color characteristics are visually the same in all projector areas. The electronic unit is also adapted to divide the pixel color and brightness between or amongst the projectors 1 to 3 such that a uniform brightness and color mapping is achieved across the curved screens 171 and 181. It should be noted that any number of individual projectors can be used and the overlapping areas can be shared amongst many projectors while applying the same calibration techniques.

Figure 19:
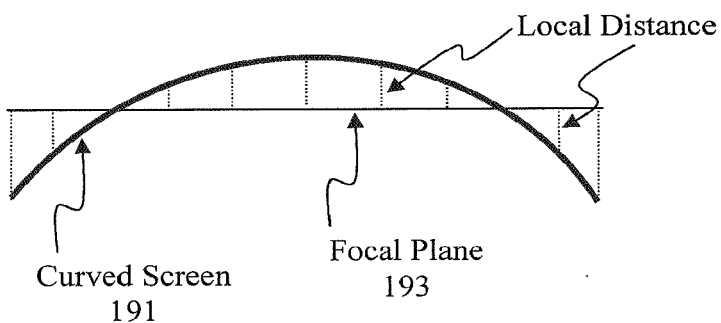
FIG. 19 is an illustration of an example of a focusing technique that minimizes a distance function.

For projection onto a curved screen, the focus problem is always paramount. This stems from the fact that a projector has a flat focal plane whereas the screen is curved, and as such, different portions of the screen have different distances from any focal plane. Looking at a portion of the screen, the image may look more in focus than another portion of the screen. To overcome this problem while projecting with a single projector, a technique can be used to minimize defocusing, an exemplary embodiment of which is shown in FIG. 19. In this case, the calibration system places the projection focal plain in such a way that the sum of the squared distances of a series of normal lines from curved screen 191 onto focal plane 193 is minimal. If one wishes to get the center of the screen more focused than the sides, one could give more weight to the segments connecting the center portion of the screen to the focal plane.

In this case, the optimal focal plane can be pre-computed based on the known shape of the screen. The intersection of the optimal focal plane with the screen gives the points on the screen where the image is best focused, and in turn, a maximal contrast is obtained. With the optimal plane and maximal contrast points computed and known, an image test pattern, similar to that used in FIG. 16, is projected onto the screen, and the image is then captured and analyzed for contrast. If the maximum contrast positions in the captured image coincide with the previously determined maximal contrast points, within some tolerance, then the projected image lies on the optimal focal plane. If the maximum contrast points do not coincide with the previously determined maximal contrast points, then the projector focus is adjusted and the process repeated until a match is obtained. It should be noted that this technique is applicable to screens which are curved in one dimension (e.g. cylindrical, zero spatial curvature, etc.) or in two dimensions (e.g. spherical, non-zero spatial curvature, etc.).

Figure 20:
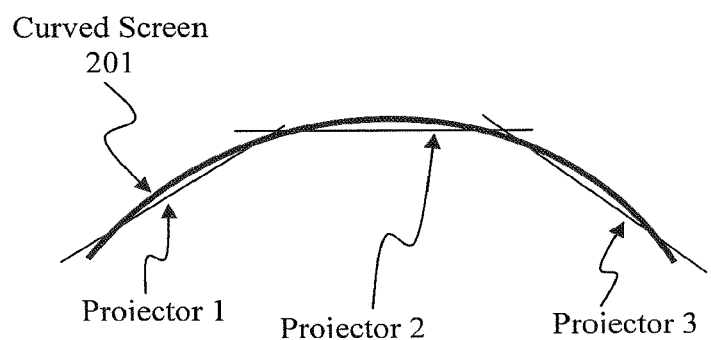
FIG. 20 is a partial illustration of another exemplary embodiment of a calibration system consisting of multiple projectors and a curved screen, with the projector positions adjusted to optimize image focus.

In another exemplary embodiment partially shown in FIG. 20, in addition to the calibration already explained, the focus problem is addressed by projecting images from multiple projectors at different angles. As shown in this figure, by shining the projectors at these specific angles on specific areas of curved screen 201, one could substantially eliminate the defocusing problem. The angles are such that each projection axis is substantially normal to the corresponding screen portion on which it projects and each focal plane is almost tangential at its center to the covered portion of curved screen 201. To optimize each segment's focus, a technique identical to the one shown in FIG. 19 could be used. Alternatively, the center of each focal segment could be kept tangent to the screen. In this exemplary embodiment, the calibration system matches the focus of the multiple projector overlapped area as well as the pixel geometry, brightness, and color to produce a smooth and seamless and in-focus image on the screen 201. As a result of this technique, the warping becomes much less severe as the angle between the focal planes and the screen tangents decreases.

A system which calibrates a sensing device for multiple color geometry has been discussed. Similarly, the system can be used to calibrate the color (non-geometric) distortions in the sensing device. Using a calibrated and corrected display device, fixed color patterns are shown on the screen and recorded by the sensing device; the same patterns used for calibrating the display color distortion can be used. Knowing the original color value, the color map of the camera can be obtained analogous to equation (25). From the color map, the color correction parameters $\vec{\lambda}_C'$ for the camera can be determined, which will vary spatially if there is color distortion. The model for the correction can be, for example, a linear least squares fit. The correction parameters fully characterize the calibration data for the camera's color distortion.

The color correction has been presented in terms of the primary colors and luminance. The system can be adapted to handle correction and adjustment of an arbitrary color. Test patterns or various colors (not simply primary colors or grey levels) can be used to obtain the color map of the display in an analogous manner to equation (31), which is shown in equation (52).

$$(x_i^o, y_i^o, \vec{C}_{is}^o) \rightarrow (x_i^o, y_i^o, \vec{C'}_{is}^o), s=1 \ldots S \tag{52}$$

Here each $\vec{C}$ gives a color vector with all components and not simply a specific primary component. The set of colors used can be chosen as some regular sampling of vectors in the entire color space. The inverse map is now represented by equation (53).

$$\vec{C}_i^o = \vec{f}_I^{-1}(\Lambda'_i, \vec{C}_i^{\prime o}) = \sum_r \vec{\lambda}''_{ir} B_r(\vec{C}_i^{\prime o}), \tag{53}$$

$$r = 1 \ldots R$$

$$\Lambda'_i = [\vec{\lambda}''_{i1} \ \vec{\lambda}''_{i2} \ \ldots \ \vec{\lambda}''_{iR}]$$

Here each color parameter is a vector of length K (the number of primary colors). In terms of the previous notation:

$$\vec{\lambda}''_{ir} = \begin{bmatrix} \lambda'_{i1r} \\ \lambda'_{i2r} \\ \vdots \\ \lambda'_{iKr} \end{bmatrix} \tag{54}$$

However this is not simply a rearrangement of the color parameters into a single equation, as the basis functions now are defined over the entire color space and not simply one dimension of the color space (i.e. one primary color). For a polynomial form, the basis functions are defined in equation (55).

$$B_{i1,i2,\ldots,iK}(\vec{C})=(C_1)^{i1}(C_2)^{i2}\ldots(C_K)^{iK} \tag{55}$$

The λ parameters can be further generalized by introducing a K dimensional patch structure, with Q patches, in color space as shown in equation (56).

$$D_C=\{C_{q1}^0,\ldots,C_{qK}^0,C_{q1}^1,\ldots,C_{qK}^1\}, q=1 \ldots Q$$

$$\text{Patch } q=\{\vec{C}|C_{qk}^0 \leq C_k \leq C_{qk}^1, k=1 \ldots K\} \tag{56}$$

This adds another index to the color parameters as shown in equation (57).

$$\vec{\lambda}''_{irq} = \begin{bmatrix} \lambda'_{i1rq} \\ \lambda'_{i2rq} \\ \vdots \\ \lambda'_{iKrq} \end{bmatrix} \tag{57}$$

This gives a general transformation in color space at every spatial grid point (centers of the shapes). The calibration color data is now defined by equation (58).

$$F_{WC}:(x_i,y_i) \rightarrow \Lambda'_i = \{\vec{\lambda}''_{i1q} \vec{\lambda}''_{i2q} \ldots \vec{\lambda}''_{iRq}\} \tag{58}$$

In the absence of any distortion this grid would be an identity at every coordinate. The warp generator will convert this to a surface functional having the form specified in equation (59).

$$\lambda'_{krq}(u, v) = \sum_{i,j} c_{ij}^{krq,p} u^i v^j \tag{59}$$

$$k = 1 \ldots K, r = 1 \ldots R, q = 1 \ldots Q$$

$$p = 1 \ldots P_k$$

$$i = 0 \ldots L_x^k, j = 0 \ldots L_y^k$$

Lastly the digital warping unit will evaluate this polynomial and apply the color correction using equation (53).

Having a general color map at each spatial coordinate, allows correcting for any color at any coordinate. This includes performing common color adjustments, such as white point adjustment, contrast adjustment and hue adjustment, independently for different regions of the display. All of these adjustments are specific functions in color space and hence can be brought to the general form specified by equation (53) via a functional approximation. With the added feature of a patch division in color space, selective color correction can also be made. The correction can be restricted to specific colors, leaving others not changed, by forcing an identity grid outside of the color patch to be corrected. This includes selective hue correction, where specific hues are corrected for and other hues are untouched. Using the system's general color calibration and correction, high color accuracy can be achieved in the display device.

The system can also be used for custom adjustment of color by providing custom color parameters $\lambda'_{ikrq}$, which can be computed outside the system and input to the warp generator 13. Similarly, custom geometric effects (special effects) can be achieved by providing custom geometry grids $(x'_{di}{}^k, y'_{di}{}^k)$ to the warp generator 13.

Figure 21:
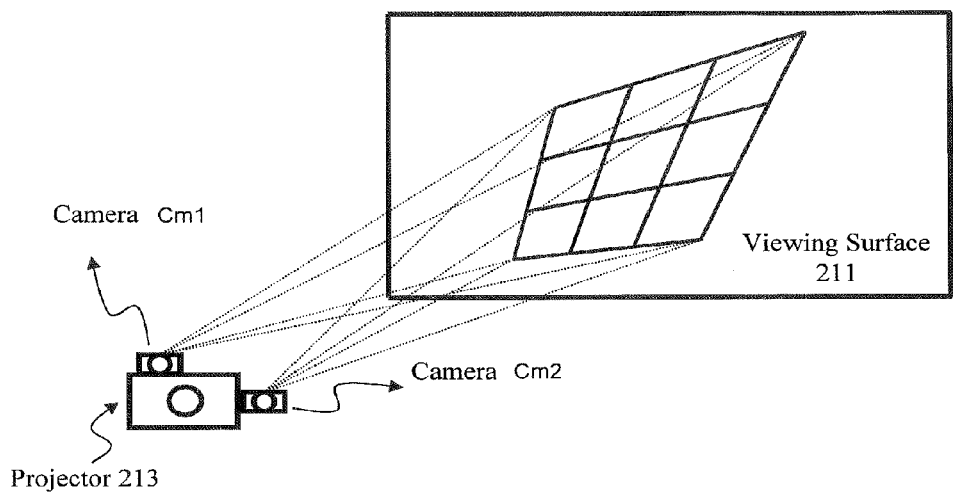
FIG. 21 is a partial illustration of an exemplary embodiment of a calibration system using multiple cameras.

In another exemplary embodiment, which is partially shown in FIG. 21, two cameras Cm1 and Cm2 are mounted on a projector 213. An input image is provided to the projector 213, which then generates a corresponding projected image pattern on a viewing surface 211. The two cameras Cm1 and Cm2 are used to capture the projected image pattern on the viewing surface 211. The system further includes a processor (not shown but described previously). The relative position of the two cameras Cm1 and Cm2 is known to the processor. The two cameras Cm1 and Cm2 can be staggered horizontally, vertically, or both horizontally and vertically with respect to the projector 213. The processor, based on the comparison of the two captured images from the two cameras Cm1 and Cm2, determines the distortion parameters including the angles of the projector 213 relative to viewing surface 211. The electronic correction unit (not shown but described previously) then applies a warp transformation to the input image to correct for these distortions.

Figure 22:
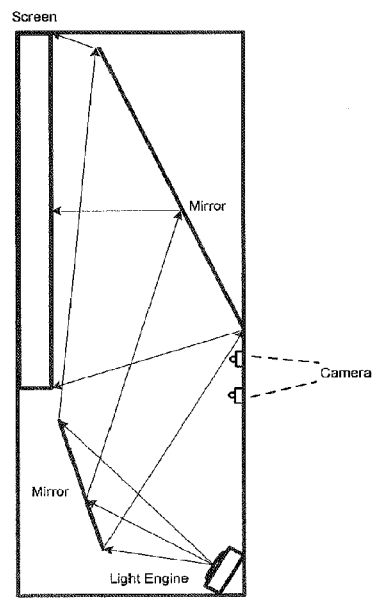
FIG. 22 is a partial illustration of an exemplary embodiment of a Rear Projection TeleVision (RPTV) with an integrated calibration system, which makes the display self-calibrating and allows for dynamic distortion correction.

The resulting projected image is substantially distortion free. This system and method can be used in a Rear Projection Television (RPTV), for example, where one or more cameras are mounted to the RPTV in a fixed position and orientation as seen in the exemplary embodiment shown in FIG. 22. The cameras can also be mounted in other ways. These cameras capture patterns projected onto the RPTV screen. The view of the RPTV screen from the camera's perspective may have some keystone distortion associated with it. However, with the calibration system being part of the display device, the display can be made self-calibrating as discussed above.

Figure 23:
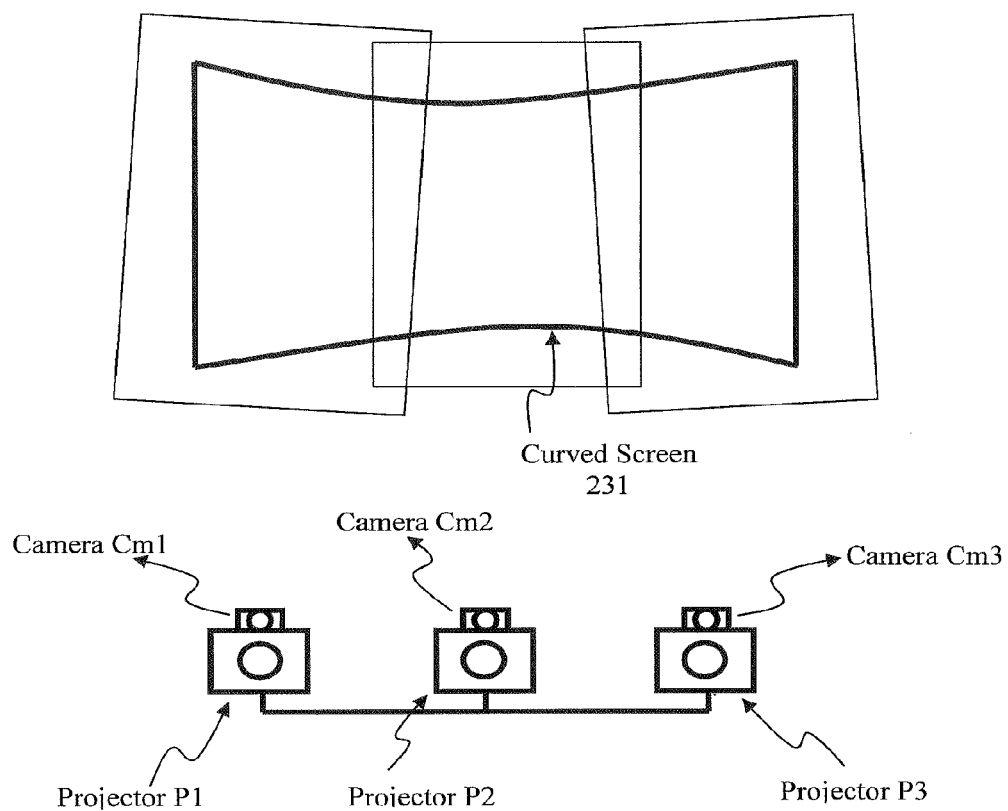
FIG. 23 is a partial illustration of an exemplary embodiment of a calibration system consisting of multiple projectors and multiple sensing devices.

In another exemplary embodiment partially shown in FIG. 23, a number of projectors P1 to P3 are used to project an image onto a curved screen 231. Meanwhile a number of cameras Cm1 to Cm3 are used to capture the images projected by each projector P1 to P3. The number of cameras Cm1 to Cm3 and the number of projectors P1 to P3 is arbitrary in this embodiment. In one case, each camera Cm1 to Cm3 can be used to capture the images from all of the projectors P1 to P3. The cameras Cm1 to Cm3 can be staggered horizontally as well as vertically with respect to each other. Each projector P1 to P3 is adapted to project a known pattern or test image on the curved screen 231 for calibration. Based on the images captured by the cameras Cm1 to Cm3, a processor (not shown but described previously) computes the distortion parameters, including the shape and relative orientation of the curved screen 231. These parameters are then used by the processor to generate a warp transformation that is applied to the input images that are provided to each projector P1 to P3 during normal use. The warp transformation for each projector P1 to P3 is such that it pre-compensates for the display distortions suffered by that particular projector. Moreover, the brightness for each projector P1 to P3 can be analyzed to make the overall brightness of the projected image on the viewing surface 231 uniform. In addition, the processor aligns pixels in the overlapped region and distributes the brightness of those overlapping pixels amongst the different projectors fore seamless image quality.

In an alternative embodiment of the system of FIG. 23, the luminance and color data can also be captured by the cameras Cm1 to Cm3. These data are then used by the processor to match and blend the edges of different adjacent images by adjusting the intensity for each pixel. The overall luminance and color of all the projectors P1 to P3 can also be normalized by the processor.

Figure 24:
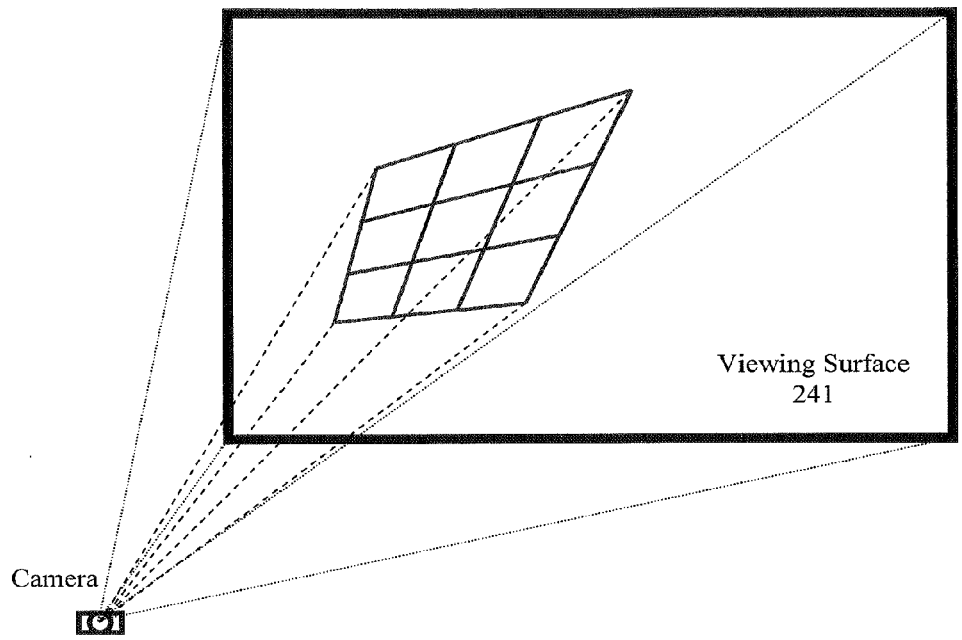
FIG. 24 is a partial illustration of an exemplary embodiment of a calibration system using physical edges and the boundary of the viewing surface.

In another exemplary embodiment partially shown in FIG. 24, the sensing device (in this case camera) is used to capture a projected image that has been projected with or without patterns. In the meantime, the camera is also used to detect shape, size, relative orientation and boundaries of a viewing surface 241. The boundary edges can be the edges of a pull-down viewing surface (i.e. a retractable projector screen), or the corners of a room, etc. A processor (not shown but previously described) then analyses the direction of the edges of the image and the pattern of the test image to compute the viewing surface characterizations such as shape, size, boundary and relative orientation. With this computation the display distortions are determined. Based on the complexity of the pattern of the image projected and then captured, the electronic correction unit (i.e. processor) determines the distortion parameters. For simple patterns, the electronic correction unit can determine the angles of the projection compared with the viewing surface normal. With more complex patterns, the electronic correction unit can determine the shape of the viewing surface, e.g. curved or irregular viewing surface. The electronic correction unit can also determine distortion parameters related to lens imperfection such as pincushion or barrel distortions. Once the distortion parameters are gathered, the appropriate pre-compensating warp map is applied to the input image data to correct for these distortions and the resulting image will be visually distortion free.

In an alternative embodiment, the system of FIG. 24 is further adapted to correct for projection onto a flat surface, in the absence of any physical markers or edges. The distortion from the projection may include both keystone and lens distortion. In this system, a camera is attached to the projector in a fixed position and orientation. The calibration and correction is performed in a two-step process. In the first step, a complete calibration procedure, making use of test image patterns, can be used to store images of patterns, as captured by the camera, at known keystone angles and lens distortion parameters, including zoom level. Furthermore, any additional information, such as warp data, required for the correction can also be stored. This step can be performed in a factory where the projector is assembled and can be viewed as factory calibration. The second step occurs in the field where the projector is being used. The projector projects the same patterns used in the first step, which are then captured by the camera. These field captured patterns are compared with the factory captured patterns along with stored distortion parameters obtained in the factory, to determine the distortion parameters of the projector in the field. Knowing the distortion parameters in the field, the correction warp can be retrieved, if already stored, or built in real-time to correct for the projector keystone and lens distortion. Since the comparison is made with previously stored information (images), no real edges or markers (such as a screen bezel) are needed. The data stored in the factory need not be full images, but may be grid data, or other parameters characterizing the patterns for different distortion levels.

In another alternative embodiment, the camera is used to correct for keystone distortion by using a simple grid-type image pattern consisting of only 4 points. In this case, the test pattern is as in FIG. 2a or 2b, consisting of a 2×2 grid (only 4 points are needed). For keystone distortion, without any lens distortion, 4 points are sufficient to determine the distortion. The four points may be placed anywhere as it suffices to simply know their position (before and after projection) to determine the keystone correction. This method can also incorporate any projector lens shift adjustments, which are simple translations of the 4 points. For a projector with a zoom lens that may or may not have lens distortion, the calibration can first be performed on axis (i.e. no keystone distortion) for different zoom levels and the correction warps stored. Then the correction warp (for the appropriate zoom level and lens distortion) can be applied and the calibration repeated only for keystone correction using 4 points. The keystone correction can be concatenated or functionally composed with the zoom lens correction to obtain a final map that corrects for all projector distortions. The lens correction need only be computed and stored once during a factory calibration procedure. The keystone correction is then performed using the camera in the field and composed with the lens correction.

Figure 25:
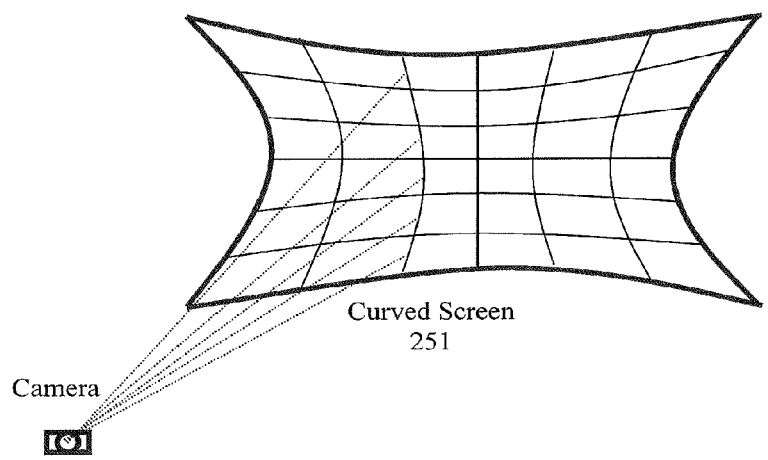
FIG. 25 is a partial illustration of an exemplary embodiment of a calibration system that uses a focusing technique to determine the shape of a curved display screen; and, FIG. 26 is a partial illustration of an exemplary embodiment of a calibration system that uses a focusing technique to determine the shape of a rippled display screen.

Another exemplary embodiment is partially shown in FIG. 25 and relates to the case of projection on a curved screen 251. To determine a map of the curved screen 251, containing shape and distance, a two-dimensional image pattern, e.g. a checkered image pattern, is projected onto the viewing surface. The camera is used to capture the projected image. The electronic correction unit (i.e. processor not shown but previously described) is then adapted to compute the contrast introduced by each line in the checkered pattern. By continually changing the focus, the best contrast at each point on the pattern is found as a function of the focal length. In this fashion, the surface map of the curved screen 251 is determined. The accuracy and the detail of the map depend on the complexity of the pattern projected and the number of focal distances tried. It should also be noted that this technique also yields the angle of the camera, and hence the angle of the projector relative to the viewing surface normal at each point. Once the electronic correction unit computes distortion parameters associated with the shape, size, and the angle of the viewing surface at each point, it then computes a warp transformation or uses an appropriate one already stored. This warp transformation, when applied to the input image data, results in a visually distortion free image that matches the characteristics of the viewing surface.

Figure 26:
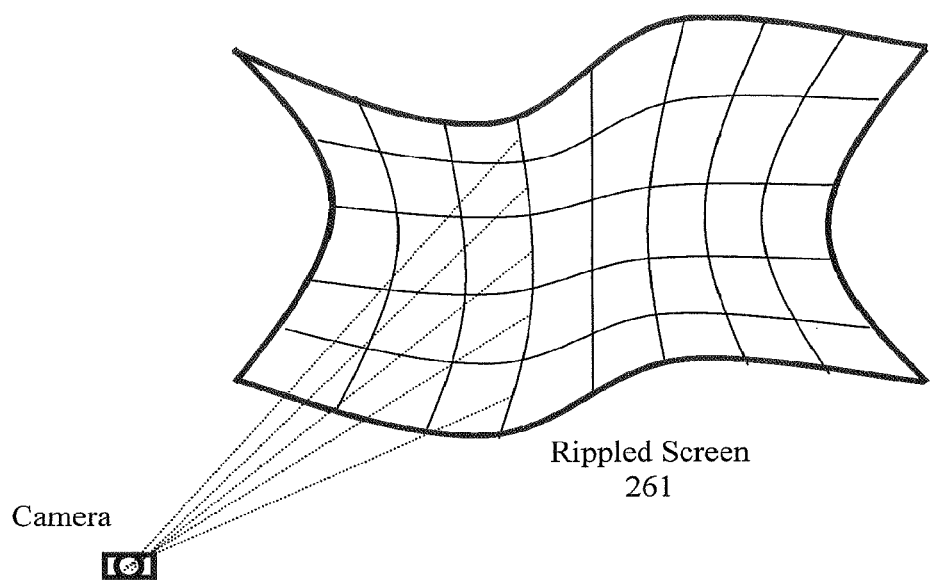

Another exemplary embodiment is partially shown in FIG. 26 and relates to the case of a rippled screen 261. The technique that was described in the embodiment associated with FIG. 25 can also be used to determine the shape and the relative orientation of the rippled viewing surface at every point. This example shows that any irregular viewing surface can be used in the display device. Once a map of the viewing surface is prepared, the electronic correction unit (not shown but previously described) uses this map to configure a warp transformation applied to the input image. Once this warp transformation is applied to the input image, the projected image is visually distortion free and matches the characteristics of the viewing surface.

While the above description provides various exemplary embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of these embodiments as defined in the claims appended hereto.

The invention claimed is:

1. A calibration method to correct for image distortion of a camera that is positioned freely with respect to a viewing surface characterized by an aspect ratio and bounded by a rectangular frame, said method comprising:
    displaying at least one test image comprising a set of reference markers with known shapes and coordinates on the viewing surface;
    acquiring an image of the viewing surface such that the frame is captured in its entirety;
    identifying the four corners of the frame and the markers, as distorted, in camera image space;
    obtaining a transformation that corrects for perspective distortion of the acquired image by mapping the images of the four corners of the frame to a second set of four-corners forming a straight rectangle that maintains the aspect ratio and is characterized with an origin and a scale in the camera image space;
    constructing a calibration grid that maps the identified markers to their respective undistorted positions with respect to the frame, onto the straight rectangle in the camera image space;
    generating a camera distortion correction map from the calibration grid, that can be applied to all image pixels.

2. The calibration method of claim 1, wherein the correction map is applied to images captured by the camera in a forward direction.

3. The calibration method of claim 1, wherein inverse of the correction map is determined and applied to pre-distort input images such that images captured by the camera appear substantially distortion free.

4. The calibration method of claim 1, wherein the camera position changes in time, and wherein said method dynamically calibrates the camera to correct for varying perspective distortions.

5. The calibration method of claim 1, wherein the correction map is obtained as a fit to the calibration grid by a set of basis functions.

6. The calibration method of claim 1, wherein the correction map is obtained as interpolation to the calibration grid by a set of basis functions.

7. The calibration method of claim 1, wherein the scale and origin of the formed straight rectangle is optimized in the camera image space.

8. The calibration method of claim 7, wherein the largest straight rectangle having the aspect ratio is chosen for maximum resolution.

9. The calibration method of claim 1, wherein the aspect ratio of the viewing surface matches aspect ratio of the camera image space, and wherein the straight rectangle is adjusted to fill the camera image space.

10. The calibration method of claim 1, wherein the camera distortion further includes lateral chromatic aberration, and wherein the at least one test image is repeated for each color component to construct a calibration grid independently for the each color component.

11. The calibration method of claim 1, wherein the at least one test image is displayed on, attached to, or projected onto, the viewing surface.

12. The calibration method of claim 1, wherein a plurality of missing markers in the image are determined and computed by extrapolation.

13. The calibration method of claim 1, wherein the four corners are determined from equations of the four edge lines obtained by parameterization of the boundary.

14. The calibration method of claim 1, wherein the frame is a physical bezel surrounding the viewing surface.

15. The calibration method of claim 1, wherein the frame is an outline displayed on or projected on the viewing surface.

16. A calibration system to correct for image distortion of a camera, said system comprising:
    a viewing surface characterized by an aspect ratio and bounded by a rectangular frame, wherein the camera is freely positioned with respect to the viewing surface;
    a test image generator for generating at least one test image having a set of reference markers with known shapes and coordinates displayed on the viewing surface;
    a calibration data generator configured to analyze the at least one test image as captured by the camera, and to construct calibration data by:
        identifying the four corners of the frame and the markers, in camera image space;
        obtaining a transformation that corrects for perspective distortion of the acquired image by mapping the images of the four corners of the frame to a second set of four-corners forming a straight rectangle that maintains the aspect ratio and is characterized with an origin and a scale in the camera image space;

mapping the identified markers to their respective undistorted positions with respect to the frame, onto the straight rectangle in the camera image space;

a warp generator to generate a camera distortion correction map from the calibration grid;

a digital warp unit to apply the correction map to the camera.

17. The calibration system of claim 16, wherein at least one of the calibration data generator, the warp generator and the digital warp unit are integrated in a processor coupled to the camera.

18. The calibration system of claim 16, wherein the camera position changes in time, and wherein said system is configured to dynamically calibrate the camera to correct for varying perspective distortions.

19. The calibration system of claim 16, wherein the at least one test image is displayed on, attached to, or projected onto, the viewing surface.

20. The calibration system of claim 16, wherein the frame is a physical bezel surrounding the viewing surface.

21. The calibration system of claim 16, wherein the frame is an outline displayed on or projected on the viewing surface.

* * * * *